United States Patent [19]

Finman

[11] Patent Number: 5,117,377
[45] Date of Patent: May 26, 1992

[54] ADAPTIVE CONTROL ELECTROMAGNETIC SIGNAL ANALYZER

[76] Inventor: Paul F. Finman, 621 Barrington Ct., Newbury Park, Calif. 91320-5117

[21] Appl. No.: 253,965

[22] Filed: Oct. 5, 1988

[51] Int. Cl.$^5$ .............. G06F 15/20; H01P 1/10
[52] U.S. Cl. .................. 364/578; 333/103; 364/481
[58] Field of Search ............... 364/148–152, 364/138, 514, 516, 572, 574, 578, 579, 481–484; 455/73, 79; 333/103, 109, 12, 81 R; 324/77 R, 77 B, 77 CS; 371/25.1

[56] References Cited

U.S. PATENT DOCUMENTS

| | | | |
|---|---|---|---|
| 3,550,041 | 12/1970 | Sauter | 333/103 |
| 3,699,444 | 10/1972 | Ghose et al. | 455/79 |
| 4,016,516 | 4/1977 | Sauter et al. | 333/103 |
| 4,423,505 | 12/1983 | Greig | 455/79 |
| 4,471,447 | 9/1984 | Williams et al. | 364/138 |
| 4,479,176 | 10/1984 | Grimshaw | 364/152 |
| 4,486,757 | 12/1984 | Ghose et al. | 342/417 |
| 4,578,747 | 3/1986 | Hideg et al. | 364/151 |
| 4,825,449 | 4/1989 | McKissock | 364/514 |
| 4,937,763 | 6/1990 | Mott | 364/148 |

OTHER PUBLICATIONS

"Dual Six Port Network Analyzer Using Diode Detectors", IEEE Trans. Microwave Theory, vol. MITT 32, No. 1, Jan. 1984, pp. 78–82.
"Homodyne Network Analyzer with Cascaded Digital Phase Shifters", Proc. IEEE, vol. 74, No. 1, Jan. 1986, pp. 66–68.
"Four Port Automatic Network Analyzer", Parts I and II, IEEE Trans. Microwave Theory, vol. MITT 33, No. 7, Jul. 1985, pp. 563–575.

*Primary Examiner*—Kevin J. Teska

[57] ABSTRACT

An electromagnetic signal analyzer is disclosed which measures a signal from a test path and a signal from an adaptively controlled reference path. Specially biased semiconductor junctions function simultaneously as electromagnetic signal attenuators, electromagnetic signal detectors, and parametric frequency converters, thereby providing unique advantages for system calibration. Adaptive modeling of the measured response to control changes gives a measure of test path and signal characteristics and also provides a prediction of the measured response for both a change in the controls and a change of the input signal. A precision complex phasor modulator serves as an important building block for measurement and control of amplitude-modulated and frequency-hopping electromagnetic signals. Specific configurations of a disclosed generic electromagnetic signal analyzer include: (1) an instantaneous frequency and amplitude detector, (2) a vector Automatic Network Analyzer (ANA) for measurement of amplitude and phase characteristics of a device under test versus frequency, (3) a vector spectrum analyzer for measurement of the amplitude and phase versus frequency of an electromagnetic signal, and (4) an Adaptive Predictor Interference Canceler for Interference suppression in a fast frequency-hopping communication system.

15 Claims, 21 Drawing Sheets

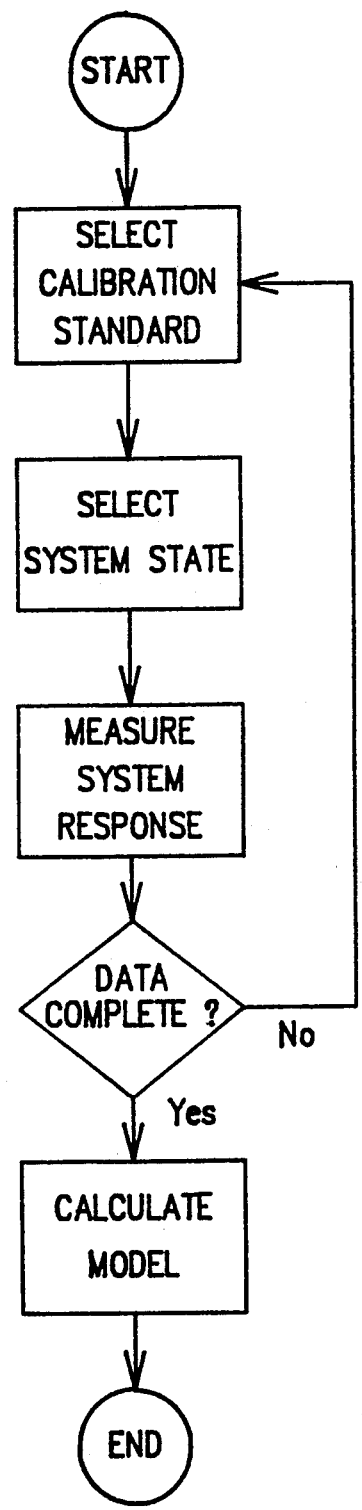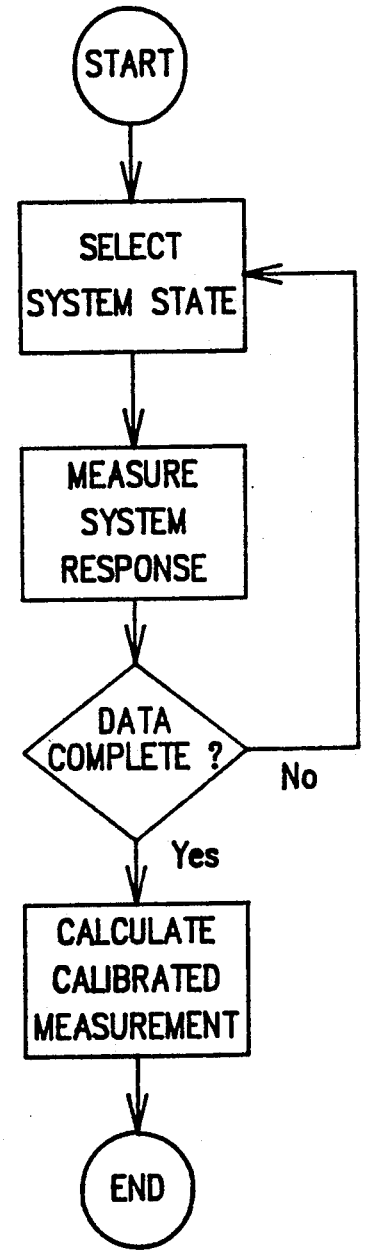
FIG 1c
FIG 1d

ADAPTIVE CONTROL ELECTROMAGNETIC SIGNAL ANALYZER

BACKGROUND OF THE INVENTION

1. Field of the Invention

This invention relates to apparatus for measuring electromagnetic signal characteristics and predicting a system response to a change in signal input; and, more particularly, to an adaptively controlled electromagnetic signal analyzer utilizing a biased semiconductor junction.

2. Description of the Related Art

Accurate measurement and control of electromagnetic signals is important in signal processing applications. Current approaches for achieving high measurement accuracy include: (1) using costly precision hardware and (2) calibrating the measurement errors of more moderately priced hardware. Although error calibration is generally more cost effective than using precision hardware, calibration accuracy associated with moderately priced components is limited.

Instantaneous frequency detectors are presently available in the electromagnetic signal processing market. Currently, biased semiconductor junctions are used to perform attenuation and detection separately in signal processing.

For measurement of the relative amplitude and phase between signals, the test instrument market is now dominated by heterodyne network analyzers with computerized calibration. In the past decade, much work has been completed on 4-port and 6-port network analyzers because of their potential for replacing the costly and complex electromagnetic and analog circuitry of a heterodyne analyzer by simple power detectors. Problems in achieving accurate calibration of power detectors over a wide dynamic range have limited the success of 4-port and 6-port network analyzers in the test instrument market.

For measurement of electromagnetic signal amplitude versus frequency, the test instrument market is dominated by dedicated heterodyne spectrum analyzers. Dual-purpose scalar network analyzers (SNA) which also perform scalar spectrum analyzer measurements are available. Dual use of circuitry common to network and spectrum measurements offers cost savings compared to separate spectrum and network analyzers. Fast Fourier Transform (FFT) processors also are available to calculate the absolute amplitude and phase versus frequency of a signal, but the frequency range is limited by available analog-to-digital converter (ADC) speeds.

Complex phasor modulators are available for controlling the magnitude and phase of an electromagnetic signal. Complex phasor modulators of the prior art are limited in the level of precision signal control over frequency and temperature, and they introduce signal distortion. This makes the prior art unsuitable for precise interference cancellation of amplitude-modulated or frequency-hopping signals.

Precise adaptive interference cancellation is needed in communication systems which must operate a radio transmitter in close proximity to a radio receiver. In this interference reduction approach, a sample signal is coupled from the interfering transmitter, passed through a controlled reference path, and then summed with the signals at the receiving antenna. The signal at the receiver is measured and the amplitude and phase of the interference in the reference path is adjusted to cancel the interference in the receiver.

For interference cancellation in a system with a narrow-band signal centered about a hopping carrier frequency, the control values at one carrier frequency may require adjustment at another carrier frequency. Fast frequency-hopping systems require the speed of a lookup table for determining control adjustment between hops. However, system changes or hostile jamming may degrade table accuracy; and there may be little, if any, time available for table update. Also, conventional methods for updating the table are based on calculating the correlation of signals by integrating over time the product of the signals. However, the accuracy of this signal correlation calculation breaks down for a fast hopping system. That is, the time at each frequency is too short to accurately define correlation between signals.

In summary, the accurate modeling and calibration of moderately priced electromagnetic signal amplitude, phase, and frequency measurement hardware in the prior art is limited. Also, complex phasor modulators of the prior art introduce unacceptable signal distortion in the control of amplitude-modulated and frequency-hopping electromagnetic signals. Finally, interference cancelers of the prior art based on long term signal correlation at a single carrier frequency are unsuitable for fast frequency-hopping systems.

SUMMARY OF INVENTION

The adaptive control electromagnetic signal analyzer of the present invention solves the problems of the prior art while maintaining moderate hardware costs. High measurement accuracy using moderately priced hardware is achieved by making multiple measurements of a system under precision adaptive control. Adaptive modeling of the system under varied control results in calibration accuracy limited only by the accuracy of the control. The adaptive modeling characterizes the system and provides a prediction of system response to signal changes.

Briefly, the invention comprises a signal source coupled to a test propagation path and a controlled reference path followed by a receiver. Specially biased semiconductor junctions form multifunction controllers/detectors which solve distortion and temperature stability problems while providing unique advantages for system calibration. The receiver detects the signals from each path and provides an uncalibrated measure of signal characteristics such as amplitude, phase, frequency, and signal-to-interference-and-noise ratio (SINR). Modeling of the multifunction controller/detector response and the receiver response for stepped semiconductor junction control under known conditions calibrates the controllers/detectors. Modeling of the response measured under stepped control states for unknown conditions provides a measure of calibrated signal characteristics in conjunction with calibrated test path characteristics. The model provides a prediction of measured performance for a change in signal characteristics or control inputs. Background processing of past performance predictions compared to actual measured performance adapts the modeling to system or test path changes.

A biased semiconductor junction serving as a multifunction electromagnetic signal controller/detector is an important building block for the adaptive control electromagnetic signal analyzer. In the present invention, a biased semiconductor junction functions simultaneously as a current-controlled electromagnetic signal attenuator, an electromagnetic signal detector, and a varactor in the adaptive control electromagnetic signal analyzer to permit improved modeling and calibration of the analyzer. A specific bias network maximizes the detected voltage from the electromagnetic signal incident on the semiconductor junction while maintaining a bias current independent of the electromagnetic signal.

An important building block of the adaptive control electromagnetic signal analyzer is the aforementioned multifunction electromagnetic signal controller/detector combined with a 90° hybrid coupler. This forms a hybrid multifunction controller/detector, thereby permitting improved modeling and calibration of the analyzer. This controller/detector serves as an important building block for a precision complex phasor modulator circuit. The improved performance of this precision complex phasor modulator compared to the prior art reduces signal distortion and sensitivity to temperature. This solves the problems associated with control of amplitude-modulated or frequency-hopping electromagnetic signals in an adaptive interference canceler.

Once a generic adaptive control electromagnetic signal analyzer is developed using the aforementioned building blocks to achieve improved modeling and calibration, the unit can be configured for specific applications.

In the present invention, the adaptive control signal analyzer operates as a low-cost, dual-purpose vector network analyzer which also measures the absolute amplitude and phase of a signal versus frequency with high accuracy. The adaptive control signal analyzer with a precision calibration model also operates as an adaptive predictor interference canceler. For interference cancellation in a frequency-hopping communication system, this permits virtually instantaneous system adjustment between frequency hops while providing real-time adaptation to system and environmental changes without dependence on the long term correlation of signals at one carrier frequency.

BRIEF DESCRIPTION OF THE DRAWING

This invention may be more clearly understood from the following detailed description and by reference to the drawing, in which:

FIG. 1 presents a block diagram of the generic electromagnetic signal analyzer system with operation flow charts. FIG. 1c presents the flow chart for fundamental calibration steps. FIG. 1d presents the flow chart for calibrated measurements.

FIG. 2 depicts biased semiconductor junction circuits which simultaneously provide controlled electromagnetic signal attenuation, electromagnetic signal detection, and parametric frequency conversion while solving signal distortion and temperature stability problems.

FIG. 3 depicts a biased semiconductor junction circuit of FIG. 2 with temperature compensation for highest temperature stability.

FIG. 5 depicts a precision complex phasor modulator which solves the problem of controlling amplitude-modulated or frequency-hopping signals in an adaptive interference canceler. FIG. 5a depicts the basic configuration while

FIG. 8 depicts the generic adaptive control electromagnetic signal analyzer configured as a vector spectrum analyzer.

DETAILED DESCRIPTION OF THE PREFERRED EMBODIMENTS

In the following description, a generic adaptive control electromagnetic signal analyzer is disclosed. Then, important building blocks of the analyzer are discussed. Finally, detailed descriptions of the generic analyzer configured for specific applications are covered. The sections on the analyzer building blocks and the specific configurations refer back to the generic analyzer to connect the concepts.

GENERIC ADAPTIVE CONTROL
ELECTROMAGNETIC SIGNAL ANALYZER

Figure 1A:
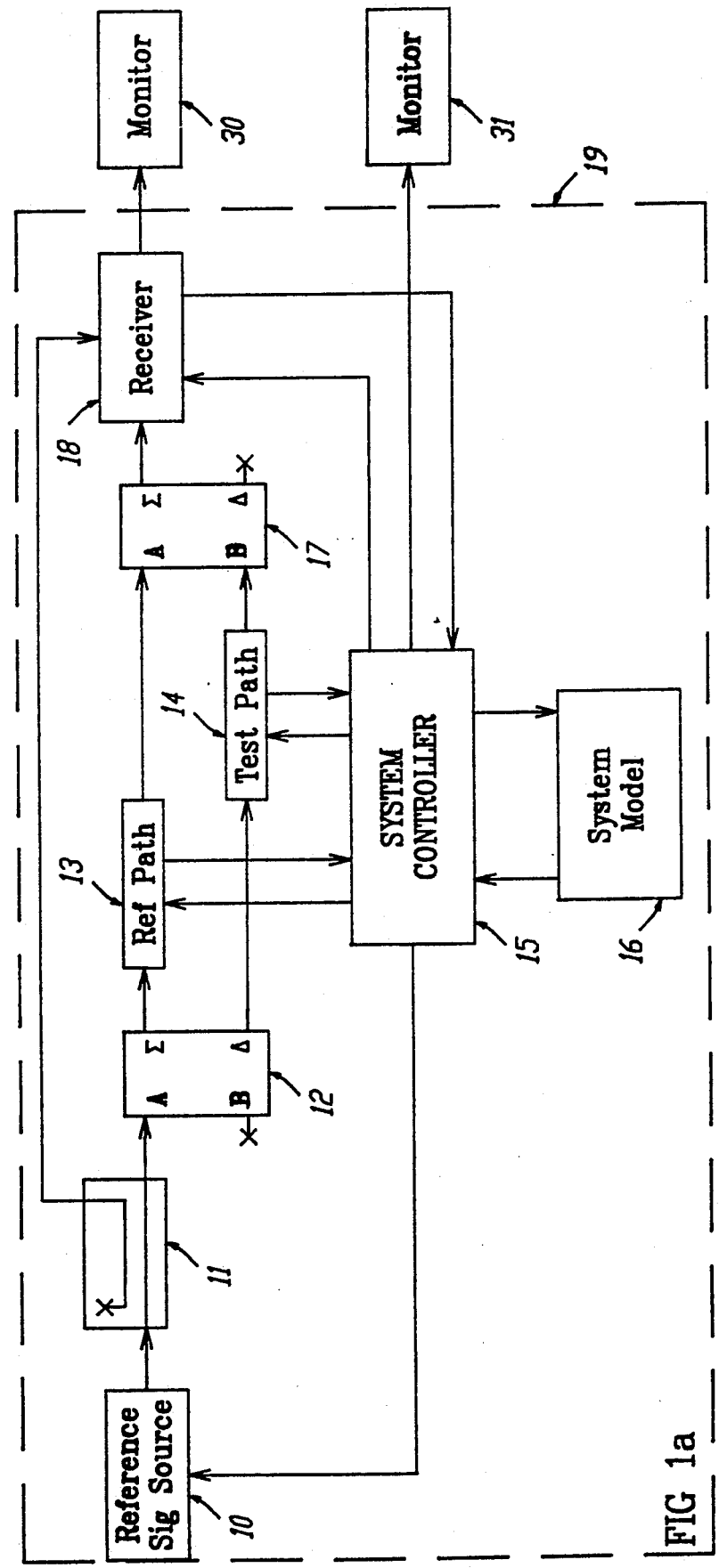
FIG. 1a depicts the system configured for test path parameter measurement.

Reference is made to FIG. 1 in the drawing for the disclosed generic embodiments of the invention and flow charts for system operation. FIG. 1a depicts the generic embodiment of the adaptive control electromagnetic signal analyzer system for measurement of test path characteristics. The system, indicated by reference character 19, receives an input from a reference electromagnetic signal source 10. Power from the signal is coupled through directional coupler 11 to the receiver 18 to be used for signal processing within the receiver. A 180° hybrid coupler 12 splits the signal in two paths: a reference path 13 and a test path 14. Either path or both paths contain biased semiconductor junctions which adjust the signal in amplitude and phase according to control inputs from the system controller 15. The biased semiconductor junctions also serve multiple purposes as electromagnetic detectors and varactors. The detected signals from the biased semiconductor junctions are output to the system controller.

The electromagnetic signals through the reference path and the test path are combined by 180° hybrid coupler 17 and then output to the receiver 18 for processing and detection. The processed and detected receiver signal is then output to the system controller 15. The receiver also has an output to an external monitor 30.

The system controller outputs set the state of the system, while the system controller inputs measure the system response. The system controller 15 also has an output to an external monitor 31. Measured system response under known control conditions provides the data necessary for development of a system model 16. Model 16 provides a measure of test path characteristics and a prediction of the system response to changes in the reference signal source 10. When predicted performance deviates from actual performance, the system controller 15 adapts model parameters to improve accuracy. In principle, the system controller 15 may consist of dedicated analog circuitry. In practice, a digital computer with analog-to-digital converters (ADC) and digital-to-analog converters (DAC) is the preferred implementation.

Figure 1B:
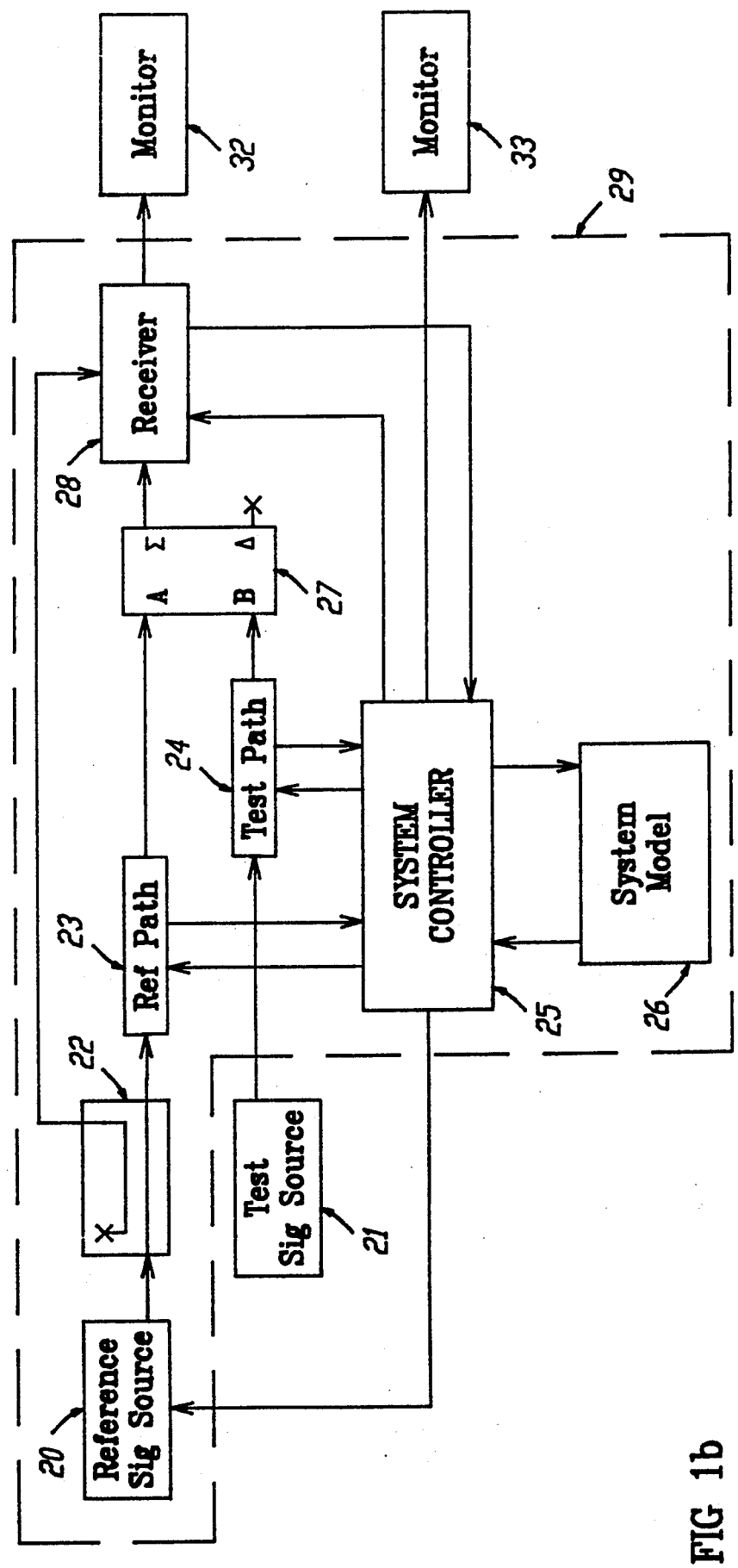
FIG. 1b depicts the system configured for test signal parameter measurement.

FIG. 1b depicts the generic embodiment of the electromagnetic analyzer system 29 for measurement of test signal characteristics. System 29 includes reference electromagnetic signal source 20 and receives an input from test electromagnetic signal source 21. Power from the reference signal source 20 is coupled through directional coupler 22 to the receiver 28 to be used for signal processing within the receiver. The reference and test signals propagate through a reference path 23 and a test path 24, respectively. Either path or both paths contain biased semiconductor junctions which adjust the signal in amplitude and phase according to control inputs from the system controller 25. The biased semiconductor junctions also serve multiple purposes as electromagnetic detectors and varactors with the detected signals output to the system controller 25.

The electromagnetic signals from the reference path and the test path are summed by 180° hybrid coupler 27. The combined signals are output to the receiver 28 for processing and detection. The processed and detected receiver signal is then output to the system controller 25. The receiver 28 also has an output to an external monitor 32.

As in FIG. 1a, the system controller outputs set the state of the system, while the inputs measure the system response. The system controller also has an output to an external monitor 33. Measured system response under known control conditions provides the data necessary for development of a system model 26. Model 26 provides a measure of test signal characteristics and also a prediction of the system response to changes in test path 24 characteristics and the reference signal source 20. When predicted performance deviates substantially from actual performance, the system controller 25 adapts model parameters to improve accuracy.

FIG. 1c presents the flow chart for system calibration. The sequence involves the following fundamental steps: (1) select known calibration standards, (2) select controllable system states, (3) measure system response with known calibration standards under controlled system states, (4) repeat the preceding steps until a complete data set is recorded, and (5) model the system response. FIG. 1d presents the flow chart for calibrated measurements. The system controller 15 or 25 steps the analyzer through known states, measures the response, and calculates a calibrated measurement based on the calibration model using a completed measured data set.

Figure 1E:
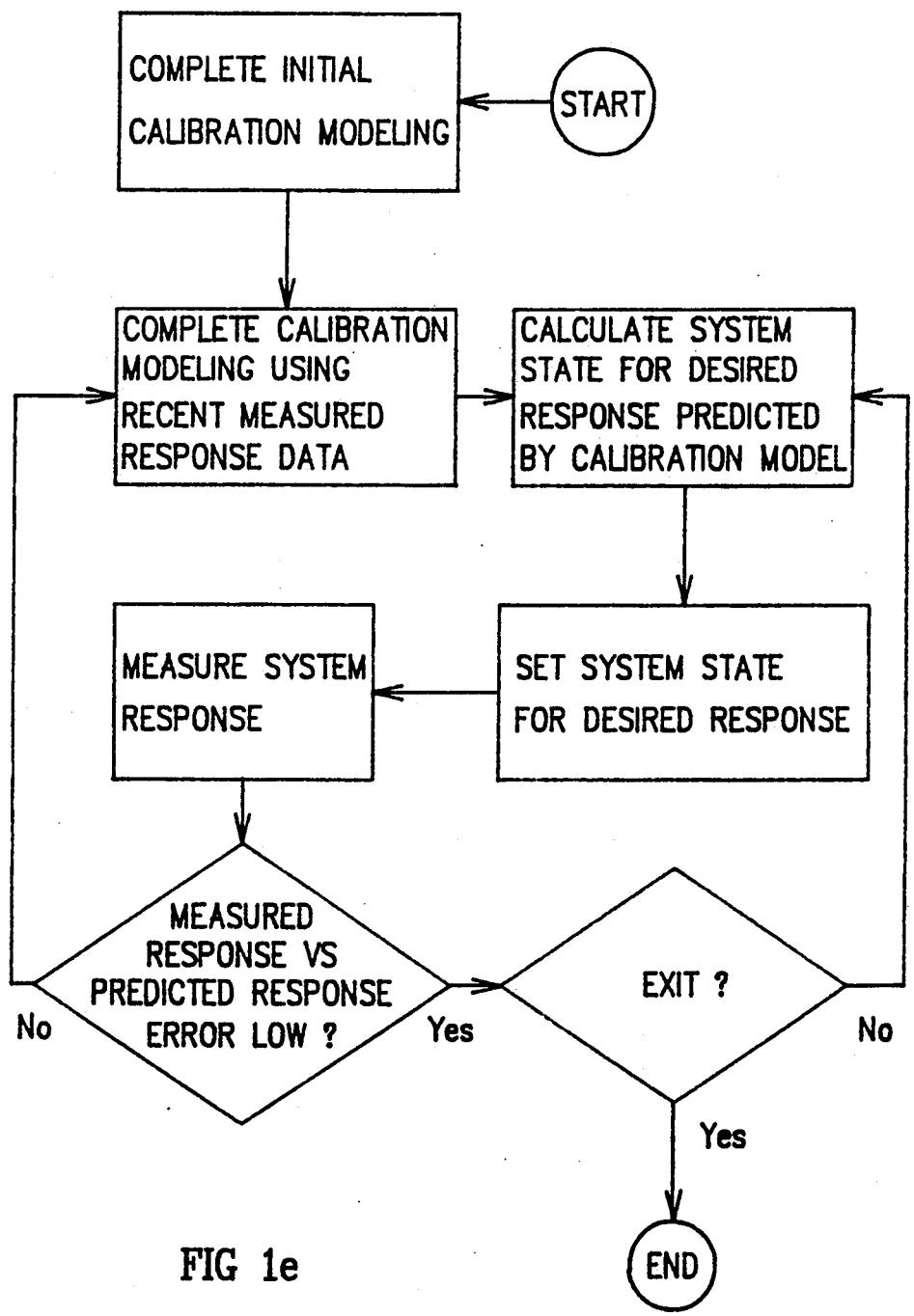
FIG. 1e presents the flow chart for operation of the system in an adaptive predictor mode.

FIG. 1e presents the flow chart for operation of the analyzer in an adaptive predictor mode. After initial calibration modeling, the analyzer operates in a continuous adaptive loop. For a known system parameter change (e.g. signal generator 10 center frequency) the system controller predicts the reference path and test path controls which produce a desired system response based on the calibration model. The system controller then sets the system state accordingly and measures the response. When the difference between the measured response and the predicted response is low, the system loops back to predict a new system state which maintains the desired response. If the difference between the measured response and the predicted response is high, the system controller recalculates the calibration model based on recent measured data and returns to the loop.

For the generic analyzer applied to general signal and device parameter measurements, specific control devices in the reference and test paths which also function as detectors permit new and improved calibration procedures. For the generic analyzer configured for adaptive interference cancellation, the specific controller/detector devices in the reference and test paths provide a novel solution to hardware problems encountered in amplitude-modulated and frequency-hopping systems. Also, the adaptive modelling and prediction of system response solve the problems of interference cancellation in new, fast frequency-hopping systems.

Parts used in the disclosed configuration include, but are not limited to, the following: Part No. O-H-30U from Olektron Corporation, Webster, MA 01570 for a 180° hybrid; Part No. O-D4-10U from Olektron Corporation for a directional coupler; Part No. 6062A from John Fluke Manufacturing Co., Inc., Everett, WA 98206 for a signal generator; Part No. STRAP-2H from Russel Industries, Inc., Oceanside, NY 11572 for an antenna; Part No. A-7550/2,4,6 from IFR Inc., Wichita, Kansas 67215 for a monitor; Part No HP72445A from Hewlett Packard, Palo Alto, CA 94303-0890 for a computer controller system; Part No. 01000-00300 from Capital Equipment Corporation, Burlington. MA 01803 for an IEEE-488 computer interface controller board., and Part No. DT2821F from Data Translations, Inc., Marlboro MA 01752 for an A/D converter, D/A converter, and digital I/O controller board.

Multifunction Electromagnetic Signal Controller/Detector Circuits

Reference is made to FIG. 2 in the drawing for disclosure of the electromagnetic control components of the invention which also serve as electromagnetic detectors and varactors. These circuits are used in the controlled reference paths 13 and 23 and test paths 14 and 24 of the generic analyzer presented in FIG. 1 to achieve lower signal distortion and improved system calibration. FIG. 2a depicts the schematic for a shunt PIN diode circuit which functions as an RF or other electromagnetic signal attenuator/detector. A bias voltage $V_B$ drives current through bias resistor $R_B$ 41, inductor 42, and PIN diode 43 to ground. The inductor 42 acts as a high-frequency signal choke and a low-frequency signal conductor, thereby providing a low-frequency bias current path isolated from the high-frequency electromagnetic signal. The capacitors 40 and 45 act as low-frequency signal blocks to the bias control and a high-frequency electromagnetic signal conductor, thereby isolating the bias current from the electromagnetic input and output. The PIN diode 43 presents a shunt impedance to the RF or other electromagnetic signal which is dependent on the bias current.

Figure 2A:
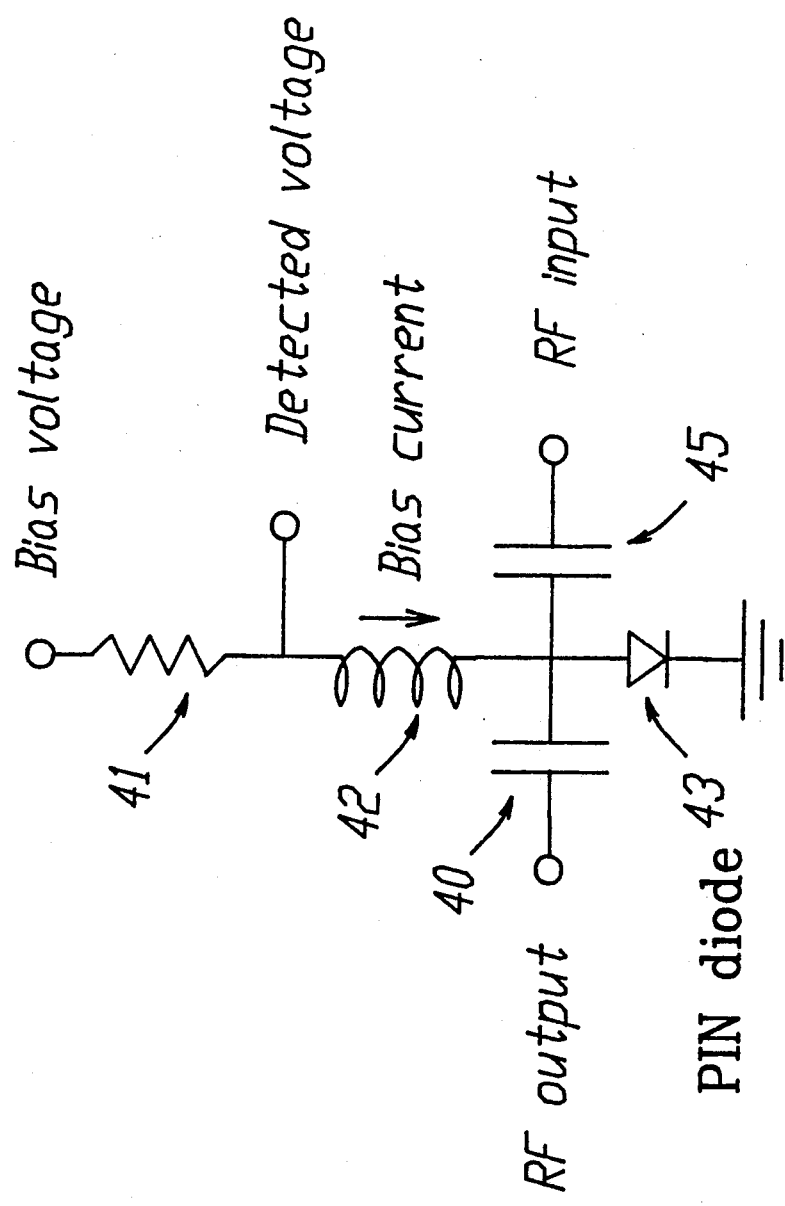
FIG. 2a and FIG. 2b depict a shunt PIN diode and a series PIN diode, respectively.

In FIG. 2a, the RF or other electromagnetic signal propagates from the input to the output with reflection, transmission, and absorption coefficients dependent on the controlled PIN diode shunt impedance. The PIN diode 43 also detects the electromagnetic signal, thereby generating a low-frequency voltage. Also, the nonlinear junction capacitance of the PIN diode 43 acts as a parametric frequency converter which generates an additional low-frequency voltage. The sum of the voltages forms a detected voltage $V_D$ dependent on both the electromagnetic signal amplitude and the PIN diode electromagnetic absorption coefficient.

It should be noted that the detected voltage $V_D$ is approximately equal to 0.6 V for forward biasing of a typical diode. When the bias voltage $V_B$ and bias resistor $R_B$ are large, the bias current $I_B$ is essentially independent of $V_D$. That is:

$$I_B = \frac{V_B - V_D}{R_B} \approx \frac{V_B}{R_B}$$

Therefore, the PIN diode is driven by a voltage controlled current source.

It should also be noted that no low-frequency conductive circuit elements in parallel with the PIN diode shunt bias current away from the diode, since this would degrade the constant current source and reduce the detected voltage level. That is, the PIN diode bias current, and therefore the PIN diode electromagnetic impedance, is not a function of the detected voltage, and the detected voltage is not reduced by additional current loading. Undesirable distortion of the electromagnetic signal results from a degraded current source since the electromagnetic reflection, transmission, and absorption coefficients become dependent on the electromagnetic signal amplitude. In highly sensitive electromagnetic signal control applications involving amplitude-modulated (AM) or frequency-hopping signals, this distortion makes an improperly constructed PIN diode electromagnetic attenuator useless. The disclosed invention avoids this subtle but significant problem while maximizing the detected voltage for a given bias current.

Figure 2B:
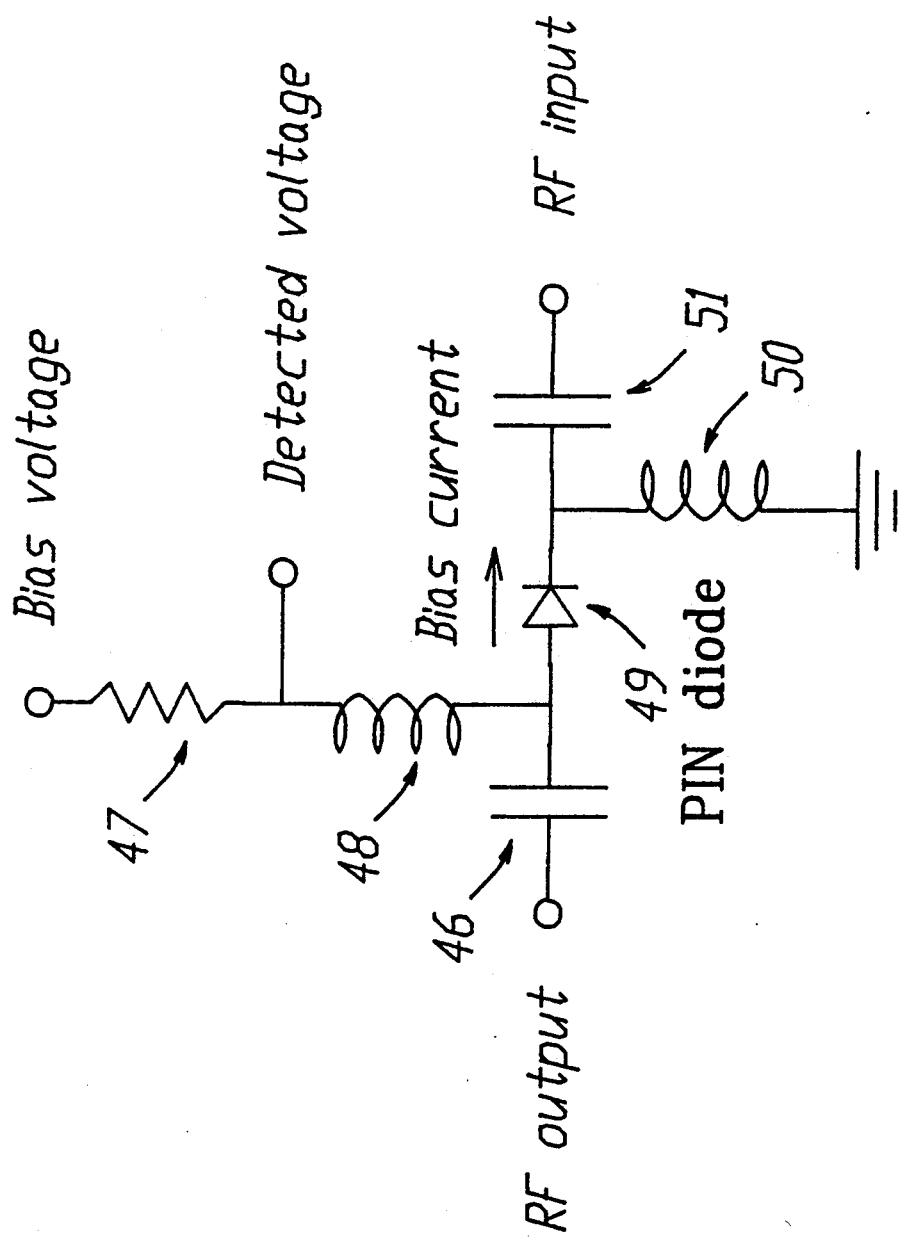

FIG. 2b depicts a series PIN diode circuit which functions as both an electromagnetic attenuator and a detector/varactor. A bias voltage $V_B$ drives a bias current $I_B$ through a bias resistor $R_B$ 47, an inductor 48, a PIN diode 49, and an inductor 50. An RF or other electromagnetic signal propagates from the input through capacitor 51, PIN diode 49, and capacitor 46 to the RF or other electromagnetic signal output. The inductors act as low-frequency signal conductors and high-frequency signal chokes to isolate the electromagnetic signal from the bias voltage. The capacitors act as high-frequency signal conductors and low-frequency signal blocks to isolate the bias current from the electromagnetic input and output.

In FIG. 2b, the PIN diode 49 acts as both a controllable electromagnetic impedance and an electromagnetic detector. That is, the electromagnetic reflection, transmission, and absorption coefficients for the input and output are dependent on the bias current $I_B$, and the detected voltage $V_D$ is a function of both the incident electromagnetic signal amplitude and the PIN diode bias current. As in FIG. 2a, the diode 49 is driven by a voltage controlled current source and no low-frequency conducting element parallel to the PIN diode degrades the constant current source.

Figure 2C:
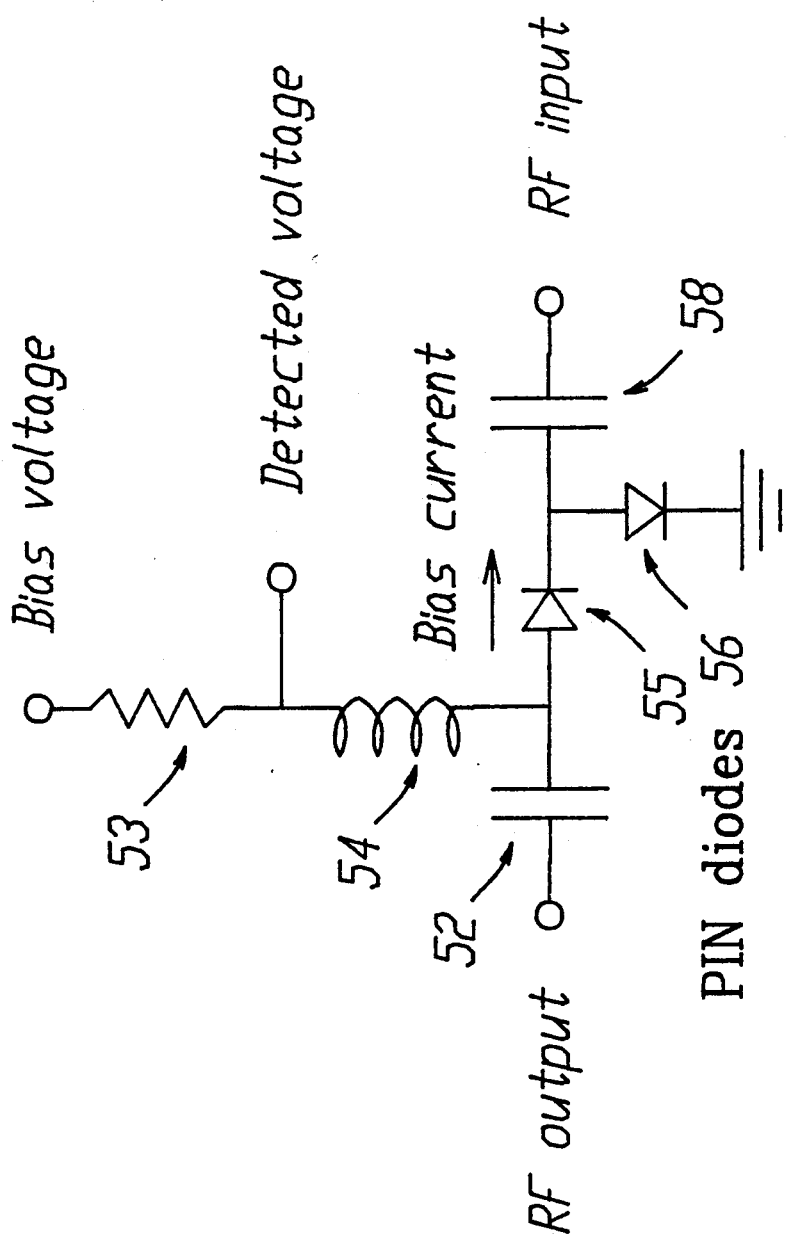
FIG. 2c depicts a shunt and series PIN diode combination. The three circuits are without temperature compensation.

FIG. 2c depicts a series PIN diode circuit in combination with a shunt PIN diode. The functions of the circuit elements have been covered in the description of FIG. 2a and FIG. 2b. That is, resistor 53 corresponds to resistors 41 and 47, inductor 54 corresponds to inductors 42 and 48, PIN diode 55 corresponds to PIN diode 49, PIN diode 56 corresponds to PIN diode 43, capacitor 52 corresponds to capacitors 40 and 46, and capacitor 58 corresponds to capacitors 45 and 51.

It should be noted that the circuits in FIG. 2a, FIG. 2b, and FIG. 2c have two electromagnetic ports, but can be readily converted to one port devices by replacing capacitor 40 by an open circuit and shorting capacitors 46 and 52 to ground. The one port configurations are useful for reflective electromagnetic signal control and detection.

Figure 2D:
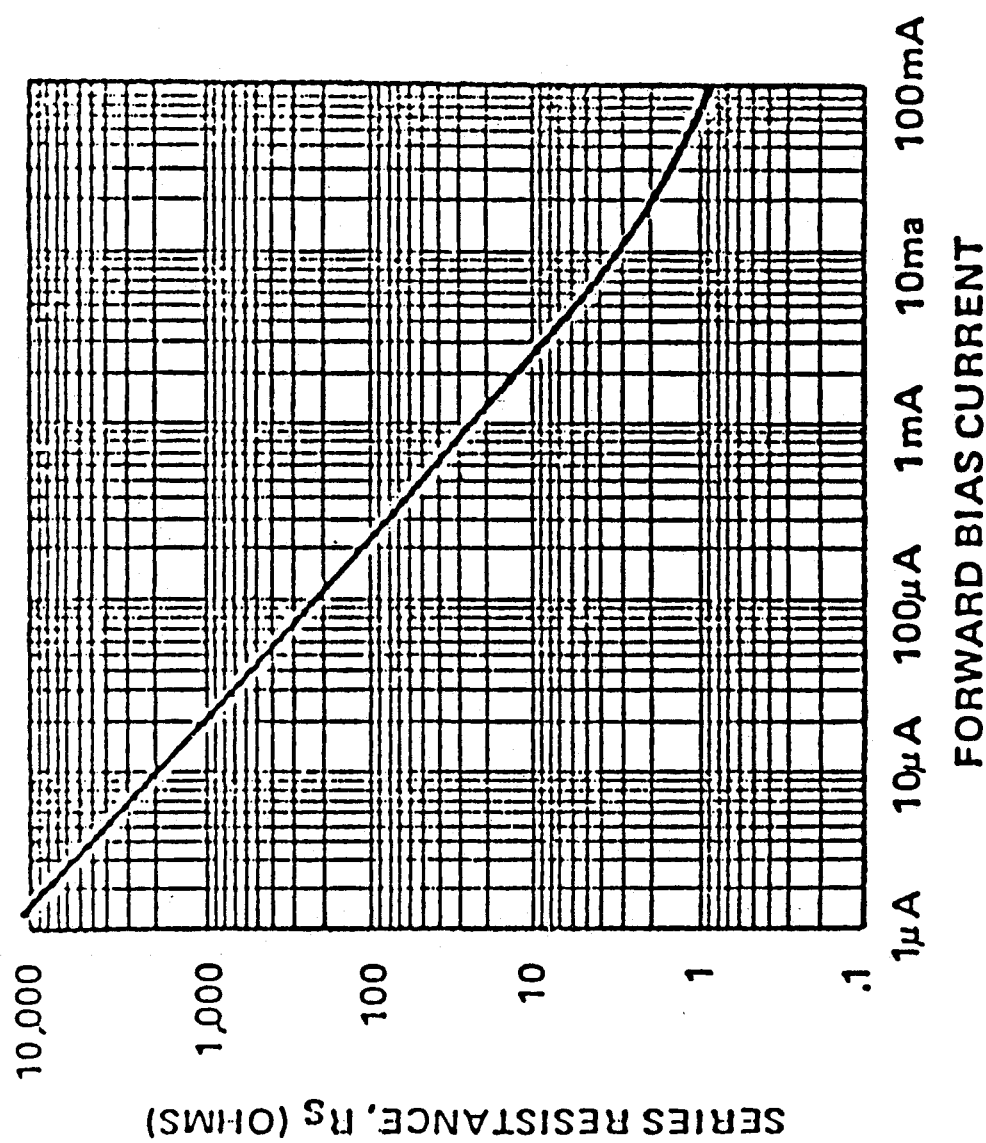
FIG. 2d depicts the I-V curves for a PIN diode.
Figure 2E:
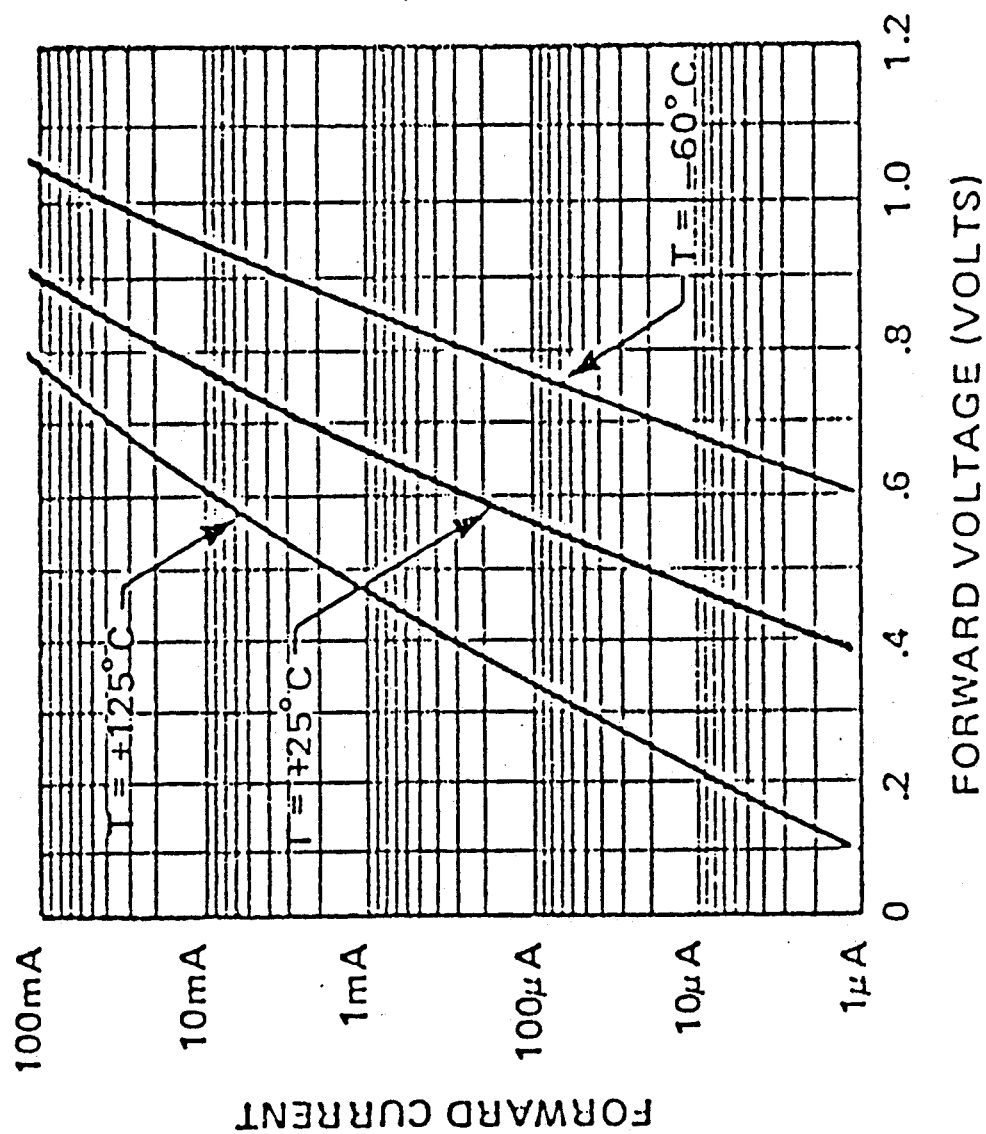
FIG. 2e depicts the electromagnetic impedance of a PIN diode as a function of bias current.
Figure 2F:
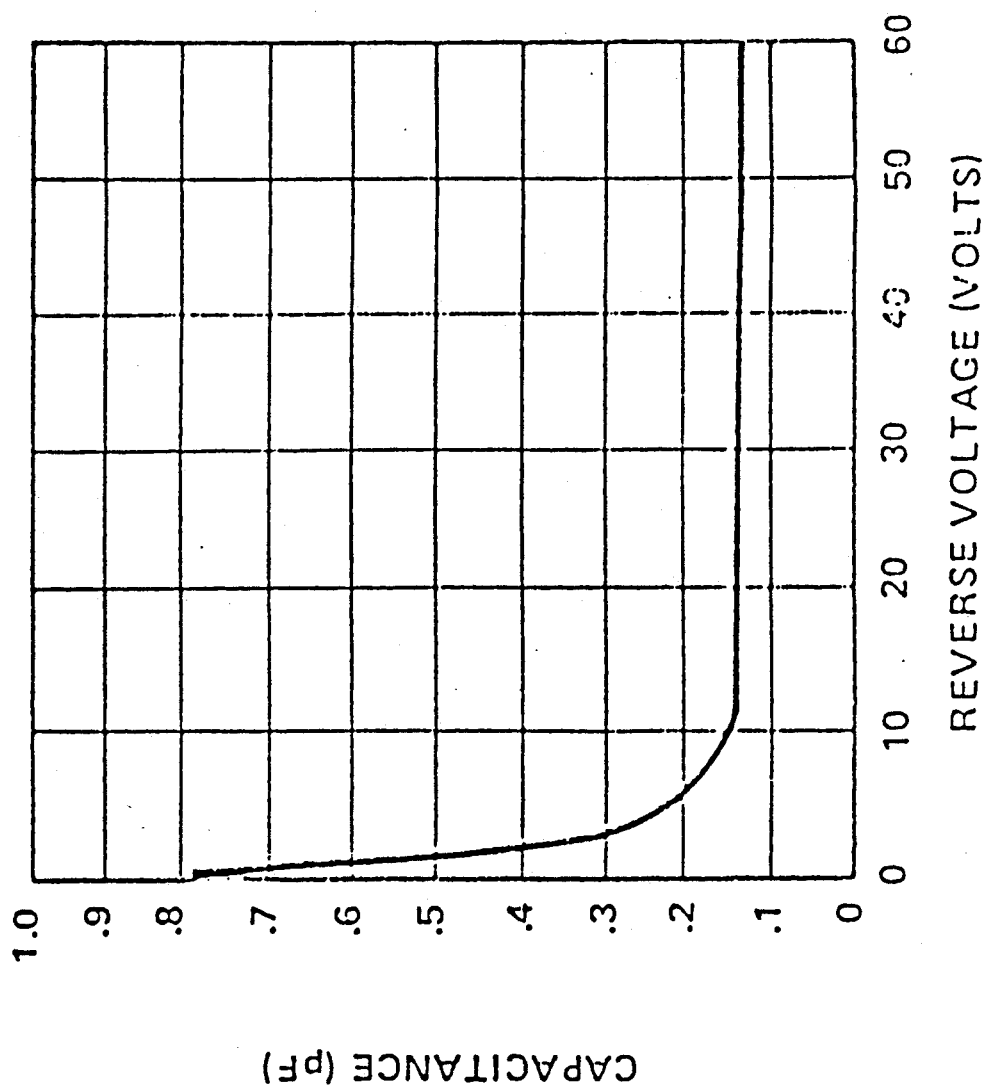
FIG. 2f depicts the C-V curve for a PIN diode. The multipurpose biased semiconductor junctions are important building blocks for the analyzer.

FIG. 2d depicts the dependence of PIN diode electromagnetic resistance on bias current. The dependence of the PIN diode electromagnetic impedance on the multiplicative inverse of the bias current permits a PIN diode to function as an attenuator. FIG. 2e depicts the I-V curves for a PIN diode. The exponential increase in current as a function of voltage is characteristic of semiconductor diode detectors, and a PIN diode acts partially as an electromagnetic signal detector. FIG. 2f depicts the capacitance versus voltage curves for a PIN diode. The nonlinear dependence of the PN junction capacitance on voltage is characteristic of semiconductor varactors, and a PIN diode functions partially as a varactor. The disclosed invention exploits these PIN diode characteristics to achieve a unique multifunction electromagnetic signal controller/detector.

Parts used in the disclosed configuration include, but are not limited to, the following: Part No. HP33150A from Hewlett Packard, Palo Alto, CA 94303-0890 for a combined electromagnetic signal choke and low-frequency signal block; Part No. HP11742A from Hewlett Packard for a low-frequency signal blocking capacitor; Part No. 96419055 from Alpha Industries, Semiconductor Division, Woburn, MA 01801 for a PIN diode; and Part No. CB-102-5 from Allen-Bradly Electronic Components Division, Greensboro, NC 27415-4309 for a bias resistor.

Figure 3A:
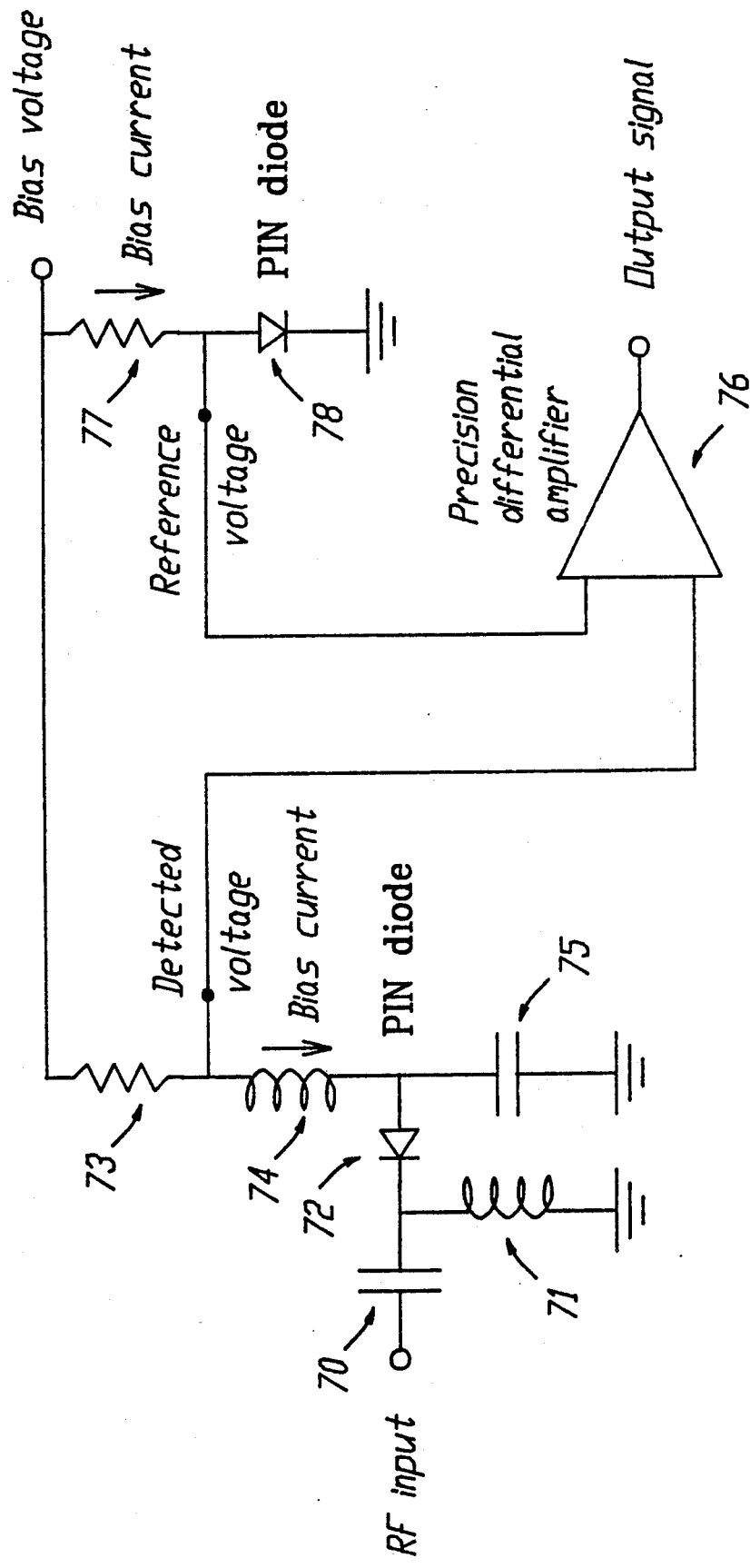
FIG. 3a depicts matched biased semiconductor pairs in parallel and FIG. 3b depicts biased semiconductor pairs with common control currents for improved accuracy.

Temperature Compensated Multifunction Electromagnetic Signal Control Circuits Reference is made to FIG. 3 in the drawing for disclosure of the temperature compensated electromagnetic signal control components of the invention which serve dual function as electromagnetic signal detectors/varactors. As for FIG. 2, these circuits are used in the controlled reference paths 13 and 23 and test paths 14 and 24 of the generic analyzer presented in FIG. 1 to achieve lower signal distortion and improved calibration. FIG. 3a depicts a temperature compensated reflective PIN diode circuit. A bias voltage $V_B$ is applied to two parallel circuits: (1) a PIN diode circuit acting as a controller/detector with an incident RF or other electromagnetic signal and (2) a reference PIN diode circuit with no incident signal.

For the controller/detector circuit in FIG. 3a, low-frequency bias current flows through bias resistor 73, inductor 74 PIN diode 72, and inductor 71. The capacitors 70 and 75 act as low-frequency signal blocks for the bias current and high-frequency signal conductors The inductors 71 and 74 act as low-frequency signal conductors for the bias current and high-frequency signal chokes. The electromagnetic signal and low-frequency bias current are therefore isolated. The PIN diode electromagnetic signal reflection and absorption coefficients are functions of the bias current, and the detected voltage $V_D$ is a function of both the incident electromagnetic signal amplitude and the PIN diode bias current.

For the reference circuit in FIG. 3a, low-frequency bias current flows through resistor 77 and PIN diode 78. The value of resistor 77 is selected such that the bias current matches the bias current of the PIN diode controller/detector circuit with no incident electromagnetic signal. The reference voltage is a measure of the forward voltage drop of the PIN diode 78 as a function of temperature.

A precision differential amplifier 76 provides an output signal with the temperature dependence of the PIN diode forward voltage drop subtracted out. As discussed in the section refering to FIG. 2, electromagnetic signal distortion is minimized and detected voltage is maximized by driving both the reference and controller/detector circuits bias currents with voltage controlled current sources. No low-frequency conductive elements in parallel to the PIN diodes substantially degrade the constant current sources or load the detected voltage output.

Figure 3B:
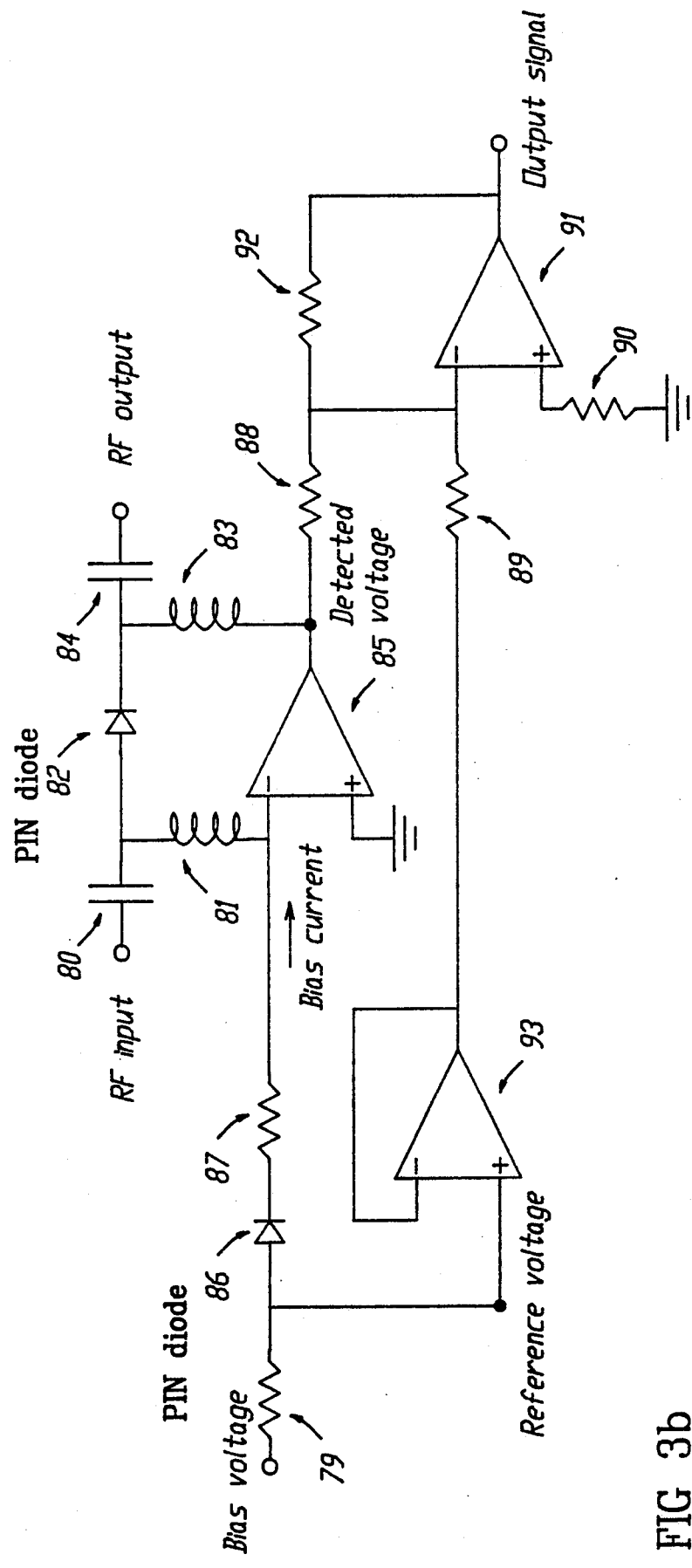

FIG. 3b depicts a PIN diode circuit with more precise temperature compensation than in FIG. 3a. A bias current $I_B$ is applied to two series circuits: (1) a PIN diode circuit acting as a controller/detector for an incident RF or other electromagnetic signal and (2) a reference PIN diode circuit with no incident signal. A bias voltage $V_B$ drives a bias current $I_B$ through a bias resistor 79, reference PIN diode 86, and resistor 87. Inductors 81 and 83, capacitors 80 and 84, and PIN diode 82 form a electromagnetic controller/detector circuit which has been covered by the discussion with reference to FIG. 2b. Operational amplifier 85 maintains a virtual ground at the inverting input by driving the controller/detector PIN diode circuit such that the bias currents through the PIN diodes are equal Resistor 87 is selected to match the series low-frequency resistance of inductors 81 and 83 For no electromagnetic signal incident on the controller/detector PIN diode, the detected voltage is the additive inverse of the reference voltage.

In FIG. 3b, operational amplifier 93 maintains current loading of the reference voltage at an ultralow level. Resistors 88, 89, 90, and 92 in conjunction with operational amplifier 91 form an inverting summer. When resistors 88 and 89 are equal, the output signal provides a measure of the detected voltage with temperature dependence balanced out. As covered by the discussion with reference to FIG. 2, the bias current is provided by a voltage controlled current source.

Parts used in the disclosed configuration include, but are not limited to, the following: Part No. HP33150A from Hewlett Packard, Palo Alto, CA 94303-0890 for a combined electromagnetic signal choke and low-frequency signal block; Part No. HP11742A from Hewlett Packard for a low-frequency signal blocking capacitor; Part No. 96419055 from Alpha Industries, Semiconductor Division, Woburn, MA 01801 for a PIN diode; Part No. CB-102-5 from Allen-Bradly Electronic Components Division, Greensboro, NC 27415-4309 for a bias resistor; Part No. AMP01 from Precision Monolithics Inc., Santa Clara, CA 95052-8020 for a precision differential amplifier; Part No. OP27EP from Precision Monolithics for a low-noise operational amplifier; and Part No. OP43EP from Precision Monolithics for a low-bias current operational amplifier.

Hybrid Multifunction Electromagnetic Signal Controller/Detector

Figures 4A, 4B:
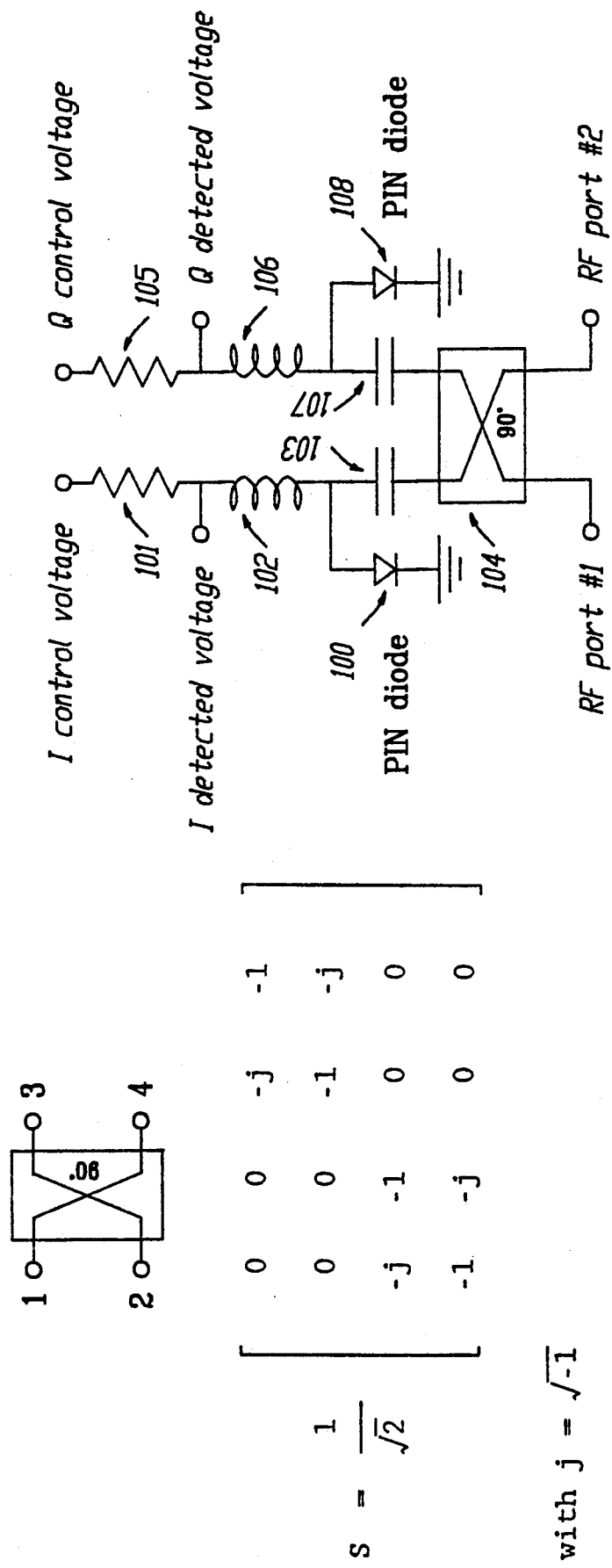
FIG. 4 depicts an electromagnetic signal amplitude controller which functions concurrently as an electromagnetic signal detector and a parametric frequency convertor. The hybrid multifunction controller/detector is an important building block for the analyzer.

Reference is made to FIG. 4 in the drawing for disclosure of a hybrid electromagnetic signal control component of the invention which also serves as a detector/varactor. This circuit uses the biased semiconductor junctions of FIG. 2 and FIG. 3 and is used in the controlled reference paths 13 and 23 and test paths 14 and 24 of the generic analyzer presented in FIG. 1 and provides reduced signal distortion and improved system calibration. A 4-port 90° hybrid 104 with scattering matrix S defined in FIG. 4a is terminated by one-port biased PIN diodes in two parallel control branches: (1) the I or in-phase control branch and (2) the Q or quadrature-phase control branch. In FIG. 4b, a voltage $V_{BI}$ controls the bias current $I_{BI}$ in the I branch, and a voltage $V_{BQ}$ controls the bias current $I_{BQ}$ in the Q branch. Resistors 101 and 105, inductors 102 and 106, capacitors 103 and 107, and PIN diodes 100 and 108 form circuits depicted in FIG. 2. The in-phase detected voltage $V_{DI}$ and the quadrature-phase detected voltage $V_{DQ}$ provide measures of the electromagnetic signal.

For the circuit shown in FIG. 4b, the electromagnetic reflection, transmission, and absorption coefficients of RF or other electromagnetic signal port #1 and RF or other electromagnetic signal port #2 are functions of the bias currents. The disclosed invention utilizes the circuit not only as an controlled attenuator but also as an electromagnetic signal detector/varactor. It should be noted that the PIN diode bias currents are provided by a voltage-controlled current source, and there is no current loading of the detected voltages. This is very important for precision control of amplitude-modulated (AM) and frequency-hopping electromagnetic signals as discussed in the section refering to FIG. 2. As pictured, the detected voltages from PIN diodes 100 and 108 are not temperature compensated. When temperature compensation is required, the circuits from FIG. 3 provide increased temperature stability.

Parts used in the disclosed configuration include, but are not limited to, the following: Part No. HP33150A from Hewlett Packard, Palo Alto, CA 94303-0890 for a combined electromagnetic choke and low-frequency signal block; Part No. HP11742A from Hewlett Packard for a low-frequency signal blocking capacitor; Part No. 96419055 from Alpha Industries, Semiconductor Division, Woburn, MA 01801 for a PIN diode; Part No. CB-102-5 from Allen-Bradly Electronic Components Division, Greensboro, NC 27415-4309 for a bias resistor; and Part No. 0-J4-100-300 from Olektron Corporation, Webster, MA 01570 for a 90° hybrid.

Complex Phasor Modulator

Reference is made to FIG. 5 in the drawing for disclosure of a complex phasor modulator which is an important building block for the analyzer configured as an adaptive predictor interference canceler. This complex phasor modulator is used in reference path 13 of the generic analyzer pictured in FIG. 1 and is built from the circuit presented in FIG. 4 The improvements in this complex phasor modulator compared to the prior art reduce signal distortion and increase temperature stability for precise adaptive interference cancellation in new fast frequency-hopping systems.

Figure 5A:
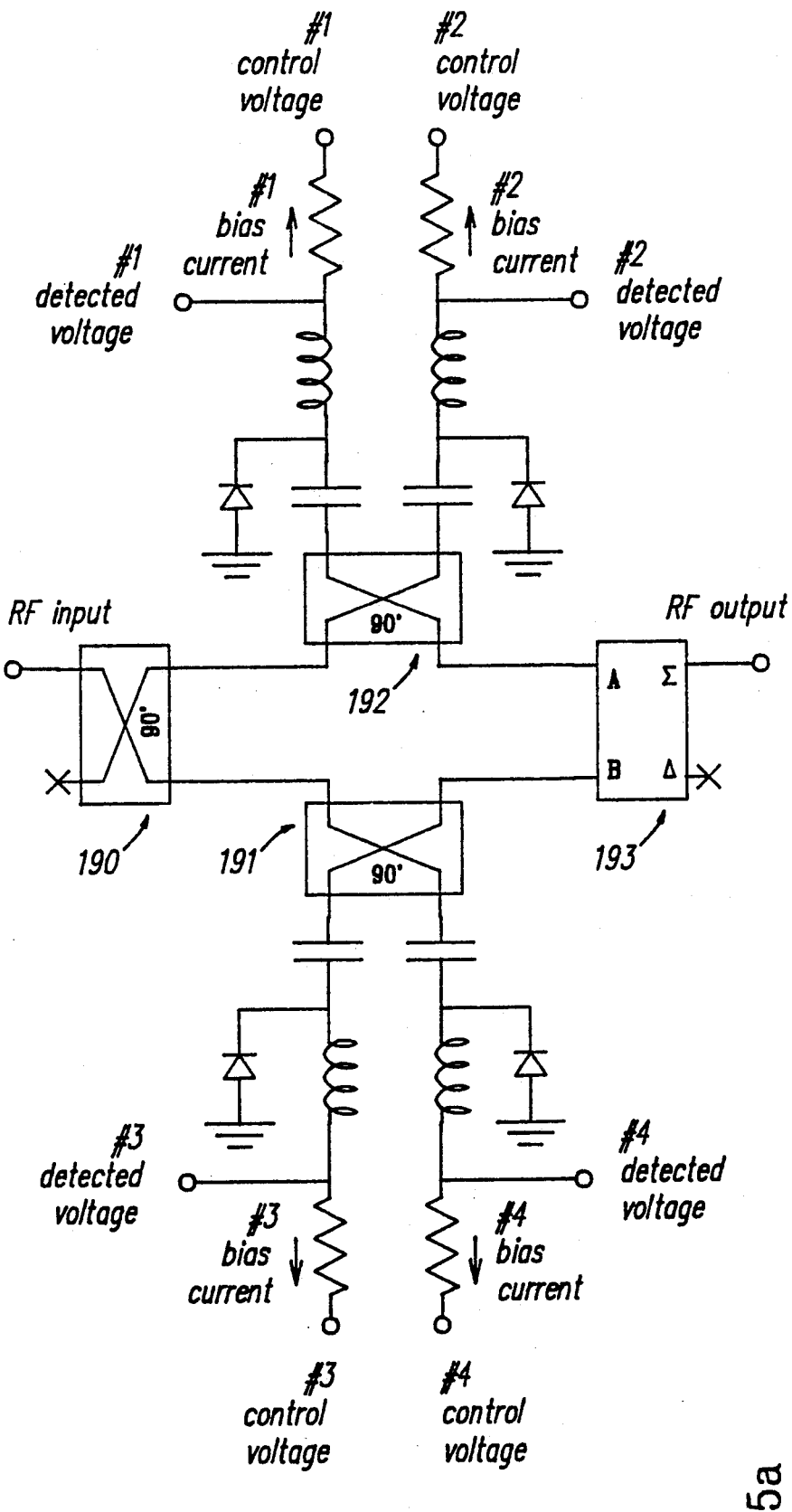

In FIG. 5a, 90° hybrid 190 splits an RF or other electromagnetic input signal into an in-phase or I component and a quadrature phase or Q component. The multifunction controllers/detectors formed by 90° hybrids 191 and 192 adjust the I and Q components in amplitude and phase depending on the control voltages $V_{B1}$, $V_{B2}$, $V_{B3}$, and $V_{B4}$. When the controls are balanced (i.e. either $V_{B1}=V_{B2}$ and $V_{B3}=V_{B4}$, or $V_{B1}=V_{B3}$ and $V_{B2}=V_{B4}$), the electromagnetic signal input port is a matched load and reflection of the signal from the input is low. The 180° hybrid 193 sums the amplitude and phase adjusted I and Q signal components to form the RF or other electromagnetic signal output. The unit provides a means for vector (i.e. amplitude and phase) modulation of a complex electromagnetic signal (i.e. a phasor) over the complete complex plane (i.e. with the amplitude loss factor A in the range $0 \leq A \leq 0.5$ and the phase $\phi$ in the range $0° \leq \phi \leq 360°$).

It should be noted that in FIG. 5, constant current sources bias the control diodes and the detected voltage nodes have negligible shunt current loading. This maximizes the detected voltage while minimizing signal distortion, and is very important for precise control of amplitude-modulated signals as discussed in the section refering to FIG. 2 This is also very important for applications in a frequency-hopping system, since during a frequency hop, the electromagnetic signal ramps up in amplitude at the start and down in amplitude at the end.

Two limitations of the configuration in FIG. 5a are: (1) control states with low bias current result in moderate to high signal distortion even with constant current biasing and (2) control accuracy is limited to the isolation between ports in 90° hybrids 191 and 192. The limitations make the configuration of FIG. 5a unsuitable for application in an adaptive interference canceler in a frequency-hopping system when cancellation levels greater than 30–40 dB must be maintained over temperature. Nonetheless, the configuration is economical and effective for less demanding applications.

Figure 5B:
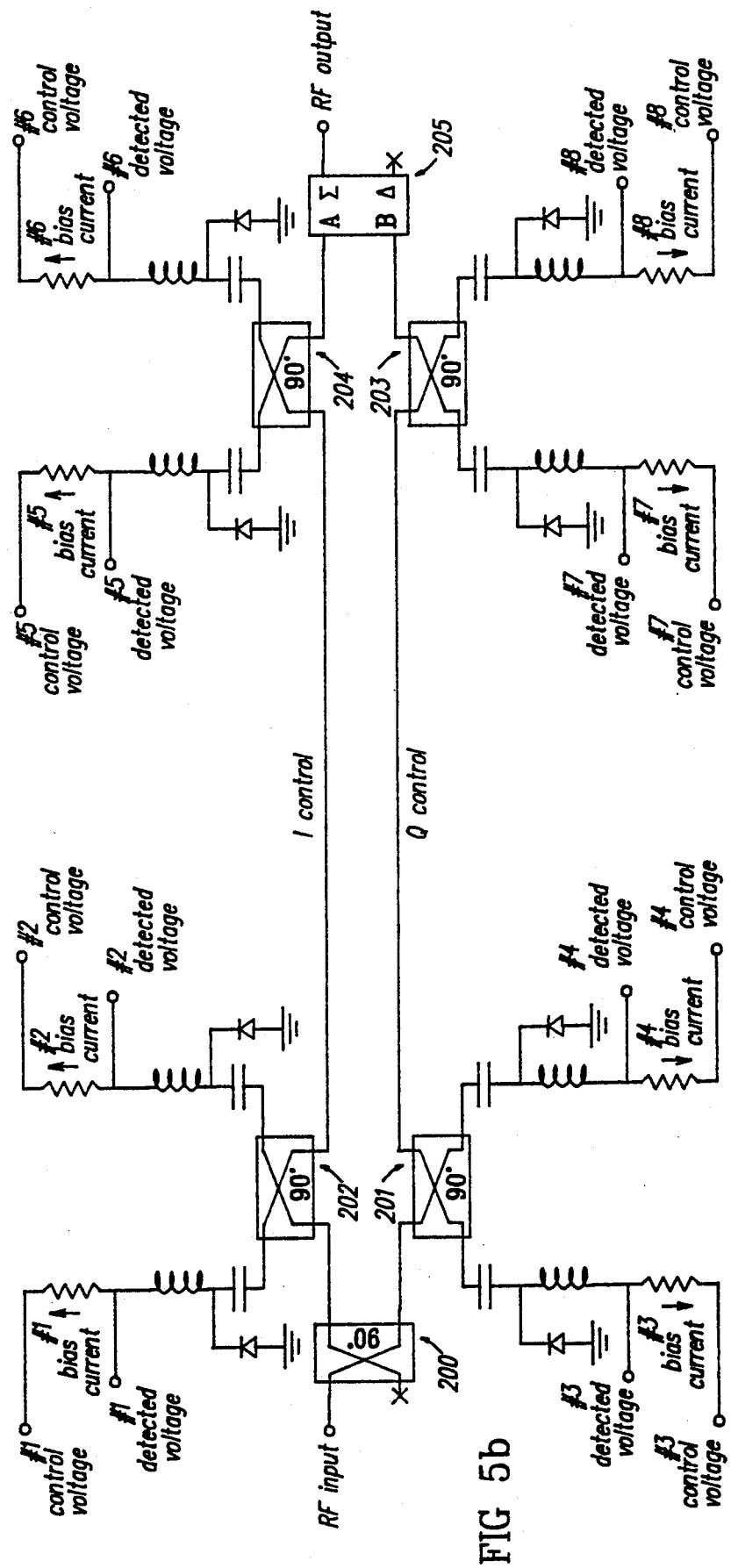
FIG. 5b depicts the configuration for precise, low distortion control and detection of electromagnetic signals. The precision complex phasor modulator is an important building block of the analyzer configured as an adaptive predictor interference canceler.

FIG. 5b presents a precision complex phasor modulator without the limitations of the configuration in FIG. 5a. As in FIG. 5a, 90° hybrid 200 splits an Rf or other electromagnetic signal into an I component and a Q component. The multifunction controllers/detectors formed by 90° hybrids 201, 202, 203, and 204 adjust the I and Q signal amplitudes depending on the control voltages $V_{B1}$, $V_{B2}$, $V_{B3}$, $V_{B4}$, $V_{B5}$, $V_{B6}$, $V_{B7}$, and $V_{B8}$. The 180° hybrid 205 sums the amplitude and phase adjusted I and Q signal components to form the modulated complex phasor output. The redundant multifunction controllers/detectors permit all amplitude and phase adjustment factors to be achieved without low bias currents, thereby greatly reducing distortion. Also the cascaded 90° hybrids effectively multiply the isolation between ports, thereby improving the minimum level of control accuracy from typically −30 to −40 dB for a single hybrid controller/detector to −60 to −80 dB over temperature and frequency for cascaded hybrid controllers/detectors.

For the complex phasor modulators presented in FIG. 5a and FIG. 5b, the electromagnetic amplitude and phase adjustment are nonlinear functions of the control inputs. The nonlinear dependence can be modeled by calibration equations, and a controller programmed with the calibrated models can provide linear control of electromagnetic amplitude and phase. An effective means for control linearization in a digital system employs a read-only memory (ROM) programmed with a model lookup table.

Parts used in the disclosed configuration include, but are not limited to, the following: Part No. HP33150A from Hewlett Packard, Palo Alto, CA 94303-0890 for a combined electromagnetic choke and low-frequency signal block; Part No. 96419055 from Alpha Industries. Semiconductor Division, Woburn, MA 01801 for a PIN diode; Part No. CB-102-5 from Allen-Bradly Electronic Components Division, Greensboro, NC 27415-4309 for a bias resistor; Part No. O-J4-100-300 from Olektron Corporation, Webster, MA 01570 for a 90° hybrid; and Part No. O-H-30U from Olektron Corporation for a 180° hybrid.

Electromagnetic Amplitude/Frequency Analyzer

Figure 6:
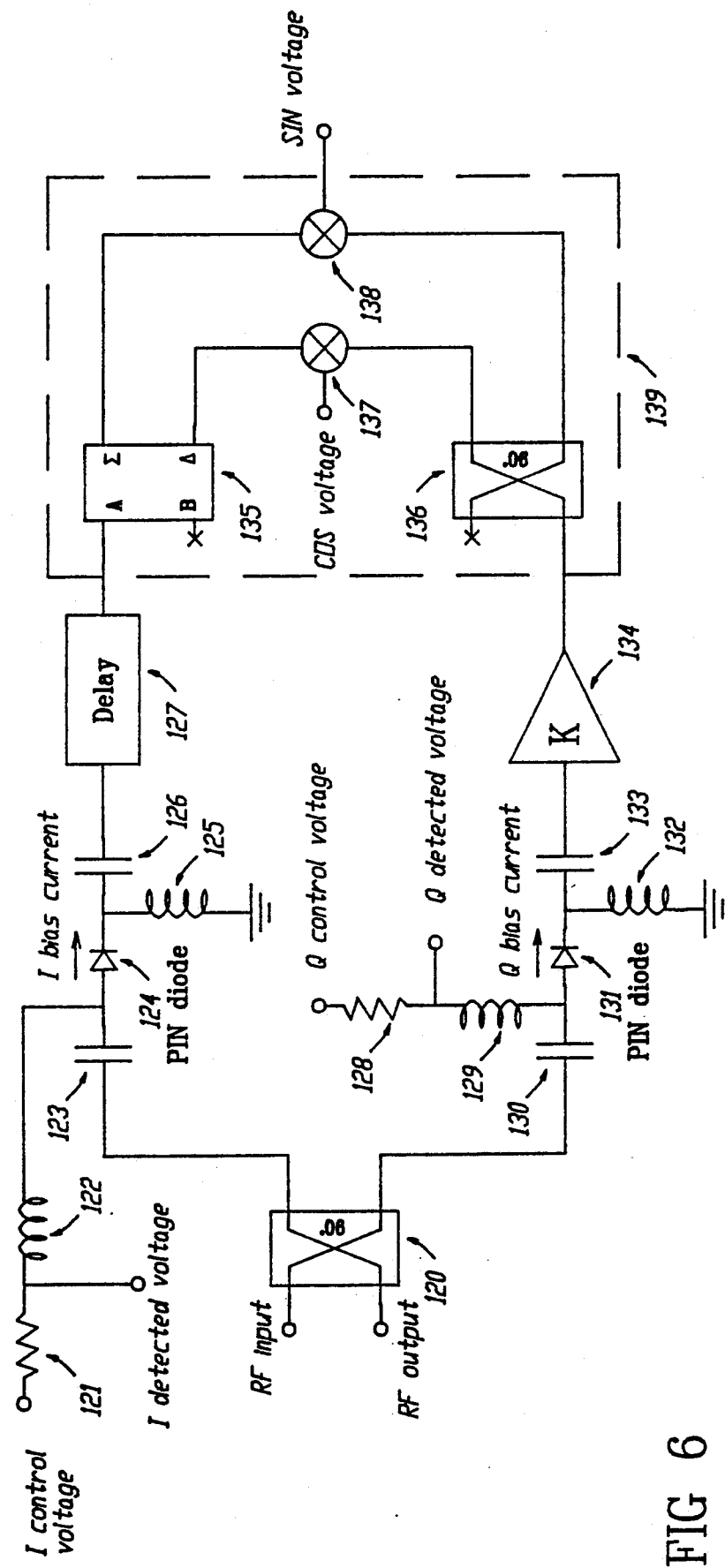
FIG. 6 is the block diagram for an instantaneous power/frequency measurement system based on the generic adaptive control electromagnetic signal analyzer.

Reference is made to FIG. 6 in the drawing for disclosure of the invention configured as an instantaneous electromagnetic amplitude/frequency analyzer. This circuit is based on the generic analyzer of FIG. 1 and incorporates the circuit of FIG. 4 as an important building block. The unit provides improved accuracy through better calibration compared to the prior art. An RF or other electromagnetic signal is split into two branches, the I branch and the Q branch, by a 90° hybrid coupler 120. In the I branch, resistor 121, inductors 122 and 125, PIN diode 124, and capacitors 123 and 126 form a multifunction controller/detector as discussed in the section referring to FIG. 2b. A delay line 127 with length d provides a frequency-dependent phase shift. For the Q branch, resistor 128, inductors 129 and 132. PIN diode 131, and capacitors 130 and 133 form a controller/detector parallel to the I branch. An amplifier 134 boosts the amplitude of the Q signal by a gain of K.

When the bias currents $I_{BI}$ and $I_{BQ}$ in the I and Q branches, respectively, are equal, the circuits are balanced Under balanced loading, the 90° hybrid 120 has a zero reflection coefficient at the RF or other electromagnetic signal input, and any reflections from the PIN diodes are transmitted to the RF or other electromagnetic signal output That is, the electromagnetic amplitude/frequency analyzer acts as a controllable signal sampler with excess power reflected back to the electromagnetic signal output.

A 180° hybrid 135, 90° hybrid 136 and mixers 137 and 138 form a phase comparator 139. That is, the I signal is multiplied by in-phase and quadrature phase components of the Q signal from 90° hybrid 136. The resultants form low-frequency voltages $V_I$ and $V_Q$ dependent on the cosine and sine of the relative phase $\phi$ of the I and Q signals.

A listing of the correspondence between components in the instantaneous amplitude/frequency analyzer and the generic analyzer presented in FIG. 1 follows. For splitting signal power, the 90° hybrid 120 corresponds to the 180° hybrid power splitter 12. Components 121, 122, 123, 124, 125, 126, and 127 correspond to the reference path 13. Components 128, 129, 130, 131, 132, 133, and 134 correspond to the test path 14. The phase comparator 139 corresponds to the receiver 18. The control inputs the detected outputs, the COS voltage, and the SIN voltage are terminals for connection to the system controller 15 and system model 16 of FIG. 1.

The fundamental calibration formulas follow. For an ideal phase comparator, the frequency f is ideally given by:

$$f = \frac{c\phi}{2\pi d} \text{ with } \phi = \tan^{-1}\left[\frac{V_Q}{V_I}\right]$$

and c the phase velocity of the delay line of length d. The amplitude A is also ideally given by:

$$A = \sqrt{V_I^2 + V_Q^2}$$

In practice, component non-idealities limit accurate frequency and amplitude measurement with an uncalibrated phase comparator.

Using the controllable PIN diode attenuators as detectors facilitates calibration and extends accurate measurements to a very large dynamic range. The calibration procedure involves modeling of the system under known electromagnetic signal input and under varied control. The calibration steps follow.

1. Drive the bias control voltages $V_{BI}$ and $V_{BQ}$ from a common source $V_B$, thereby setting the bias currents $I_{BI}$ and $I_{BQ}$ equal to $I_B$. This provides balanced loading of 90° hybrid 120.

2. Connect an electromagnetic signal with controllable frequency f and amplitude A to the RF or other electromagnetic signal input.

3. Step the control voltage $V_B$, electromagnetic signal frequency f, and electromagnetic signal amplitude A through a range of values. Measure the phase comparator cosine voltage $V_I$ and sine voltage $V_Q$ in conjunction with the detected voltages $V_{DI}$ and $V_{DQ}$ in the I and Q control branch respectively. This forms a calibration data table. It should be noted that the control voltage $V_B$ is always set to maintain the electromagnetic signal level at the amplifier 134 and the phase comparator 139 below overload levels and above the minimum level necessary to drive the mixers.

4. Variables $R_{IQ}$ and $R_{QI}$ are defined as $V_I/V_Q$ and $V_Q/V_I$, respectively. Divide the data in the calibration table into two sets: (1) set $\alpha$ with $R_{IQ}<1$ and (2) set $\beta$ with $R_{QI}>1$.

5. Calculate the linear coefficients of $N^{th}$ order polynomials which model the frequency calibration data using what is known in the art of numerical techniques as the Singular Value Decomposition (SVD) method. The calibration functions for frequency are:

$$f_{1\alpha} = W(R_{IQ}, V_B, V_{DI}) \text{ for } R_{IQ} < 1$$
$$= w_0 + w_1 R_{IQ} + w_2 V_B + w_3 V_{DI} +$$
$$w_4 R_{IQ}^2 + w_5 V_B^2 + w_6 V_{DI}^2 + \ldots$$

$$f_{1\beta} = X(R_{QI}, V_B, V_{DI}) \text{ for } R_{QI} < 1$$
$$= x_0 + x_1 R_{QI} + x_2 V_B + x_3 V_{DI} +$$
$$x_4 R_{QI}^2 + x_5 V_B^2 + x_6 V_{DI}^2 + \ldots$$

$$f_{2\alpha} = Y(R_{IQ}, A) \text{ for } R_{IQ} < 1$$
$$= y_0 + y_1 R_{IQ} + y_2 A + y_3 R_{IQ}^2 +$$
$$y_4 A^2 + \ldots$$

$$f_{2\beta} = Z(R_{QI}, A) \text{ for } R_{QI} < 1$$
$$= z_0 + z_1 R_{QI} + z_2 A + z_3 R_{QI}^2 +$$
$$z_4 A^2 + \ldots$$

with A defined as before:

$$A = \sqrt{V_I^2 + V_Q^2}$$

It should be noted that the calibration function $f_1$ is based on the detected voltage $V_{DI}$ and the control voltage $V_B$, while the calibration function $f_2$ is based on the calculated amplitude A. A final function $f_c$ based on a combination of the two provides redundant calibrated frequency measurement with increased accuracy:

$$f_c = E(f_1, f_2)$$
$$= e_0 + e_1 f_1 + e_2 f_2 + e_3 f_1^2 + e_4 f_2^2 + \ldots$$

6. Calculate the linear coefficients of $N^{th}$ order polynomials which model the amplitude calibration data using what is known in the art of numerical techniques as the Singular Value Decomposition (SVD) method. The calibration functions for amplitude are:

$$A_1 = G(V_{DI}, V_B, f)$$
$$= g_0 + g_1 V_{DI} + g_2 V_B + g_3 f +$$
$$g_4 V_{DI}^2 + g_5 V_B^2 + g_6 f^2 + \ldots$$

$$A_2 = H(A, V_B, f)$$
$$= h_0 + h_1 A + h_2 V_B + h_3 f +$$
$$h_4 A^2 + h_5 V_B^2 + h_6 f^2 + \ldots$$

It should be noted that the calibration function $A_1$ is based on the detected voltage $V_{DI}$, while the calibration function $A_2$ is based on the calculated amplitude A. A final function $A_c$ based on a combination of the two provides redundant calibrated amplitude measurement with increased accuracy:

$$A_c = J(A_1, A_2)$$
$$= j_0 + j_1 A_1 + j_2 A_2 + j_3 A_1^2 + j_4 A_2^2 + \ldots$$

When the calibration steps have been completed, the model functions permit calculation of the calibrated frequency and amplitude of an unknown electromagnetic signal from known control inputs and uncalibrated measurements. The steps for completing a calibrated measurement of signal frequency and amplitude follow.

1. Set the control voltage $V_B$ such that the uncalibrated amplitude A is in a range that corresponds to the phase comparator mixers 137 and 138 being driven by sufficient but not excessive electromagnetic power.

2. Measure the voltages $V_{DI}$, $V_{DQ}$, $V_I$, and $V_Q$.

3. Calculate $R_{IQ}$, $R_{QI}$, and A.
4. Calculate $f_1$, $f_2$, and $f_c$ using the calibration models.
5. Calculate $A_1$, $A_2$, and $A_c$ using the calibration models.
6. For increased accuracy with a constant signal, complete multiple measurements with the control voltage $V_B$ stepped over a range of values. Then average the multiple measurements.

The FORTRAN source code listing of an example model program MODEL4 follows. The subroutine FPOLY4 calculates an array of basis functions corresponding to a selected row of a data array. The basis function array multiplied by an array of linear coefficients forms a $4^{th}$ order polynomial calibration model. In addition to being used in calculating a modeled parameter value, the subroutine FPOLY4 is used in the SVD calculation to determine the linear coefficients of the model.

```
C****************************************************************
C
C      PROGRAM MODEL4
C
C      This program calculates the value of a system
C      parameter predicted by a 4th order polynomial
C      model with linear coefficients. This forms a
C      calibration function for a generic electromagnetic analyzer
C      system.
C
C      Parameters:
C
C      YFIT(MAXR)    Array of dependent variable values
C                    predicted by model.
C      X(IROW,ICOL)  Array of independent variables.
C      IROW          Number of data rows.
C      ICOL          Number of independent variables.
C      A(MA)         Array of linear polynomial
C                    coefficients.
C      AFUNC(MA)     Array of numerical values of
C                    polynomial basis functions.
C      MA            Number of linear polynomial
C                    coefficients.
C
C      Paul Finman                              5/14/88
C      LCF Enterprises
C
C****************************************************************
C
       PROGRAM MODEL4
       REAL*8 A,X,YFIT,AFUNC
       INTEGER MAXR,ICOL,MA,INPUT,I,J,IROW,MAXC
       PARAMETER(MAXR=200,MAXC=100,ICOL=3)
       DIMENSION X(MAXR,ICOL),YFIT(MAXR),
      1          A(MAXC),AFUNC(MAXC),
      1          INPUT(ICOL)
C
C      Input data array measured by system controller
C
       IROW = 0
       OPEN(1,FILE='INPUT.DAT',STATUS='OLD')
1000   READ(1,99,END=2000) (INPUT(I),I=1,ICOL)
99     FORMAT(5I10)
       IROW = IROW + 1
       DO 10 I=1,ICOL
         X(IROW,I) = FLOAT(INPUT(I))
10     CONTINUE
       GO TO 1000
2000   CLOSE(1)
C
C      Execute dummy call to FPOLY4 to calculate number
C      of linear coefficients MA.
C
       I = 1
       CALL FPOLY4(X,ICOL,I,AFUNC,MA)
C
C      Input array of linear coefficients A(MA)
C
       OPEN(2,FILE='COEFF.DAT',STATUS='OLD')
       READ(2,98)(A(I),I=1,MA)
98     FORMAT(E12.5)
       CLOSE(2)
C
C      Calculate YFIT(I) from model
C
       DO 11 I=1,IROW
         CALL FPOLY4(X,ICOL,I,AFUNC,MA)
         YFIT(I) = 0.0
         DO 11 J=1,MA
           YFIT(I) = YFIT(I) + A(J) * AFUNC(J)
11     CONTINUE
C
C      Output YFIT(I)
C
       OPEN(3,FILE='YFIT.DAT',STATUS='UNKNOWN')
       WRITE(3,98)(YFIT(I),I=1,IROW)
       CLOSE(3)
       STOP
       END
C
C*********************************************************
C
C      SUBROUTINE FPOLY4(X,ICOL,I,P,MA)
C
C      This subroutine calculates the numerical values
C      of the basis functions of a 4th order polynomial
C      model with ICOL independent variables.
C
C      Parameters:
C
C      X(MAXR,ICOL)  Array of independent variables.
C      I             Selected row of array.
C      P(MA)         Returned numerical values of
C                    basis functions.
C      MA            Returned number of MAXC allocated
C                    storage slots used.
C      Paul Finman                              5/13/88
C
C*********************************************************
       SUBROUTINE FPOLY4(X,ICOL,I,P,MA)
       REAL*8 X,P
       INTEGER INDEX,I,J,K,L,M,ICOL,MA,MAXR,MAXC
       PARAMETER(MAXR=200,MAXC=100)
       DIMENSION P(MAXC),X(MAXR,ICOL)
       P(1) = 1.0
       INDEX = 2
       DO 10 J=1,ICOL
         P(INDEX) = X(I,J)
         INDEX = INDEX + 1
         DO 10 K=J,ICOL
           P(INDEX) = X(I,J) * X(I,K)
           INDEX = INDEX + 1
           DO 10 L=K,ICOL
             P(INDEX) = X(I,J) * X(I,K) * X(I,L)
             INDEX = INDEX + 1
             DO 10 M=L,ICOL
               P(INDEX) = X(I,J) * X(I,K) * X(I,L) * X(I,M)
               INDEX = INDEX + 1
       CONTINUE
       MA = INDEX - 1
       RETURN
       STOP
       END
```

It should be noted that the calibration equations can be extended to include additional parameters which affect system performance. For example, including a temperature measurement in the equations calibrates system sensitivity to this parameter.

Parts used in the disclosed configuration include, but are not limited to, the following: Part No. HP33150A from Hewlett Packard, Palo Alto, CA 94303-0890 for a combined electromagnetic signal choke and low-frequency signal block; Part No. HP11742A from Hewlett Packard for a low-frequency signal blocking capacitor; Part No. 96419055 from Alpha Industries, Semiconductor Division, Woburn, MA 01801 for a PIN diode; Part No. CB-102-5 from Allen-Bradly Electronic Components Division, Greensboro, NC 27415-4309 for a bias resistor; Part No. O-J4-100-300 from Olektron Corporation, Webster, MA 01570 for a 90° hybrid; Part No. O-PC-300/ZB from Olektron Corporation for a phase comparator; Part No. MCL ZFL-500 from Mini-Circuits Labs. Brooklyn, NY 11235-0003 for an electromagnetic amplifier; and Part No. HC70000-1 from Haverhill Cable and Manufacturing Corporation, Haverhill, MA 01830 for a delay line.

Vector Automatic Network Analyzer System

Figure 7:
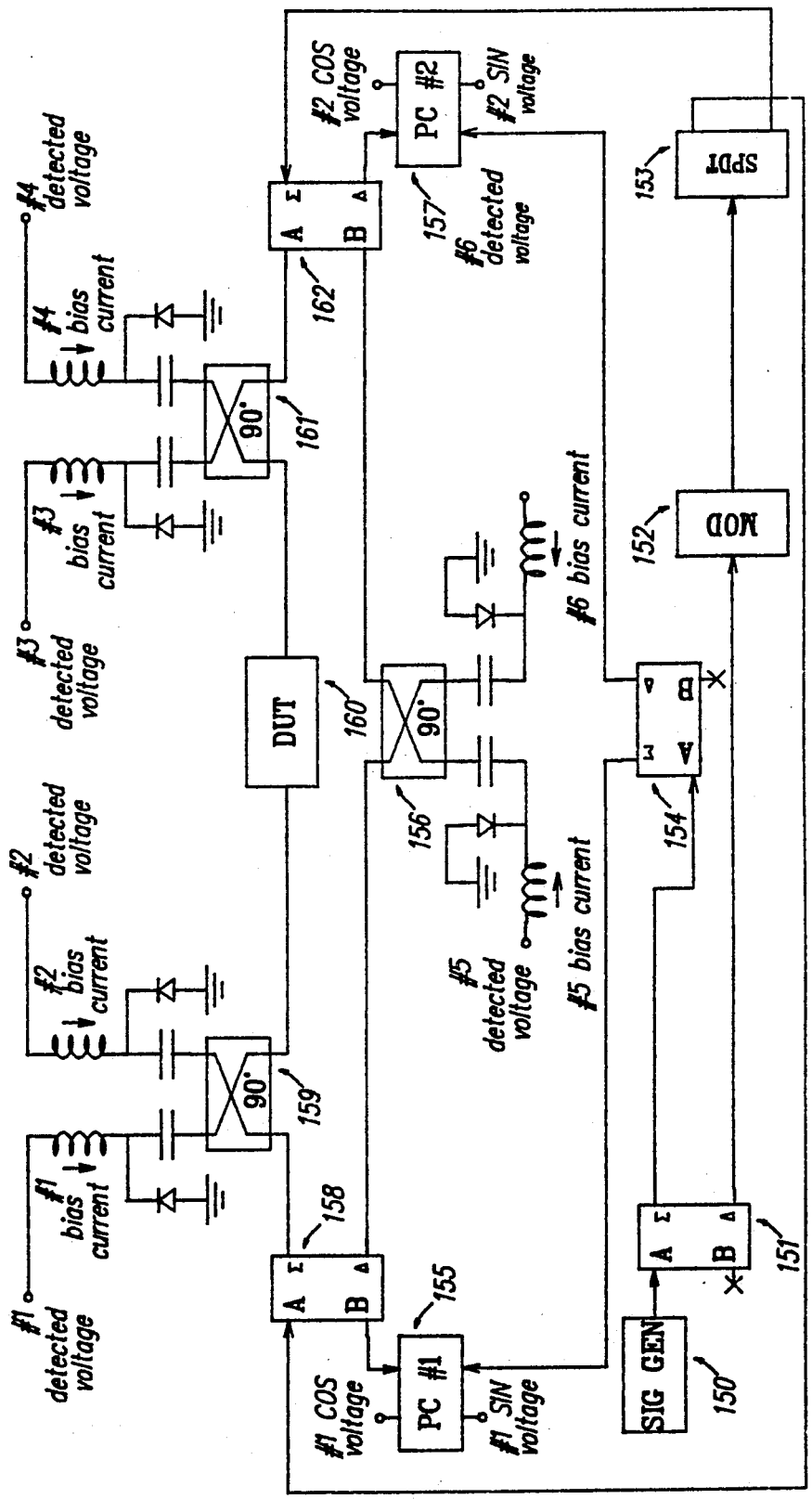
FIG. 7 is the block diagram for a vector Automatic Network Analyzer (ANA) based on the generic adaptive control electromagnetic signal analyzer.

Reference is made to FIG. 7 in the drawing for disclosure of the invention configured as a vector Automatic Network Analyzer (ANA) system. This block diagram is based on the generic analyzer of FIG. 1a and incorporates the circuits of FIG. 2 or FIG. 3 and FIG. 4. The unit provides improved accuracy compared to the prior art through better calibration of moderately priced hardware.

The output from signal generator 150 with controllable frequency is split by 180° hybrid 151. The signal feeds 180° hybrid 154 and provides reference inputs to phase comparator 155 (PC #1) and phase comparator 157 (PC #2). For the discussion of the components and function of a phase comparator, refer to the section covering FIG. 6. The modulator 152 serves as a controllable electromagnetic signal chopper. The SPDT switch 153 routes the electromagnetic signal to either 180° hybrid 158 or 180° hybrid 162, depending on the controllable switch setting.

Hybrid multifunction controller/detector 156 forms a reference path, while hybrid controllers/detectors 159 and 161 combined with the device under test (DUT) 160 form a test path. For a discussion of the components and function of a hybrid multifunction controller/detector, refer to the section covering FIG. 4. The phase comparators 155 and 157 receive the signals from both the controlled test path and the controlled reference path. The cosine voltage $V_{I1}$ of PC #1, the sine voltage $V_{Q1}$ of PC #1, the cosine voltage $V_{I2}$ of PC #2, and the sine voltage $V_{Q2}$ of PC #2 provide measures of the combined test and reference signals. The detected voltages $V_{D1}$, $V_{D2}$, $V_{D3}$, $V_{D4}$, $V_{D5}$, and $V_{D6}$ provide additional measures of the signals.

A constant current source prevents signal distortion caused by a diode control current dependent on the electromagnetic signal amplitude as discussed in the section covering FIG. 2. Chopper-based techniques can be used to reduce additional circuit errors. That is, when modulator 152 chops the electromagnetic signal at a precise frequency, the signals from the voltage outputs of the phase comparators and the detected voltages from the diodes are modulated at that frequency. Filtering and amplification of the signals permits reduction of constant circuit errors and noise. This signal processing can be completed with added analog circuitry or it can be completed digitally within a digital system controller.

A listing of the correspondence between elements in the vector network analyzer of FIG. 7 and the generic analyzer of FIG. 1a follows. Signal generator 150 corresponds to reference signal source 10. The 180° hybrid 151 performs the power-splitting function of directional coupler 11. Components 159, 160, and 161 150 corresponds to reference signal source 10. The 180° hybrid 151 performs the power-splitting function of directional coupler 11. Components 159, 160, and 161 correspond to test path 14, and component 156 corresponds to reference path 13. The vector network analyzer has double circuitry with mirror symmetry to form a bidirectional analyzer with switch 153 determining the direction of signal incident on the DUT 160. That is, depending on the switch setting, 180° hybrids 158 and 160 correspond to 180° hybrids 12 and 17, and phase comparator 155 or 157 corresponds to receiver 18. The interfaces of system controller 15 and system model 16 of FIG. 1 are shown in FIG. 7.

System calibration involves the following fundamental steps: (1) select known calibration standards, (2) select controllable system states, (3) measure system response with known calibration standards under controlled system states, and (4) model the system response. The four known calibration standards for calibration are presented in TABLE 1.

Calibration Standards
TABLE 1

| Calibration Standards | |
|---|---|
| Designation Number | Description |
| 1 | Short |
| 2 | Offset short |
| 3 | Line |
| 4 | Extended line |

The two controllable states of SPDT switch 153 are presented in TABLE 2.

SPDT Switch 153 States
TABLE 2

| SPDT Switch 153 States | |
|---|---|
| Designation Number | Description |
| 1 | Signal to side #1 |
| 2 | Signal to side #2 |

The three states of a hybrid multifunction controller/detector are presented in TABLE 3. The control voltages for the two diodes $V_{B1}$ and $V_{B2}$ are listed as either 0 or 1. A value of 0 indicates the constant bias current $I_{B1}$ or $I_{B2}$ is small, and the controlled diode acts as an open circuit with an ideal reflection coefficient of 1. A value of 1 indicates the constant bias current is large, and the controlled diode acts as a short circuit with an ideal reflection coefficient of $-1$. It should be noted that a diode with low bias current acts as a detector in addition to being a good reflector. TABLE 3 summarizes the controller reflection and transmission coefficients by listing the ideal scattering matrix which is known in the art as S-parameters.

Controller/Detector States
TABLE 3

| Controller/Detector States | | | | | | |
|---|---|---|---|---|---|---|
| Designation Number | $V_{B1}$ | $V_{B2}$ | $S_{11}$ | $S_{12}$ | $S_{21}$ | $S_{22}$ |
| 1 | 0 | 0 | 0 | $-j$ | $-j$ | 0 |
| 2 | 0 | 1 | $-1$ | 0 | 0 | $-1$ |
| 3 | 1 | 0 | 1 | 0 | 0 | 1 |

The six calibration states of the system are presented in TABLE 4. The state controllers are SPDT switch 153, hybrid multifunction controller/detector 159 which is referred to as Test C/D #1, hybrid multifunction controller/detector 161 which is referred to as Test C/D #2, and hybrid multifunction controller/detector 156 which is referred to as Reference C/D. It should be noted that the controllers/detectors provide unique calibration advantages.

System Calibration States
TABLE 4

| Designation Number | SPDT State | Test C/D #1 State | Test C/D #2 State | Reference C/D State |
|---|---|---|---|---|
| 1 | 1 | 1 | 2 | 1 |
| 2 | 1 | 1 | 3 | 1 |
| 3 | 2 | 2 | 1 | 1 |
| 4 | 2 | 3 | 1 | 1 |
| 5 | 1 | 1 | 1 | 2 or 3 |
| 6 | 2 | 1 | 1 | 2 or 3 |

TABLE 5 lists the approximate DUT parameter measured for each calibration state. Calculation of an accurate system model based on measured data and the known calibration standards provides calibration equations. That is, the four calibration standards listed in TABLE 1 form a series of 4 measurements at each calibration state for a single signal generator output power. Stepping the signal generator output power over 16 values creates a system of 64 calibration equations for each state. Additional calibration equations can be obtained by stepping amplitude and/or phase modulator 152. Parameters of the system known as "S-parameters" indicate the reflection and transmission characteristics, namely amplitude and phase, of the device-under-test. Additional calibration standards also provide additional equations. When the system of calibration equations is solved, the unknown S-parameters of DUT 160 can be accurately measured.

Approximate DUT Measured Parameters
TABLE 5

| Calibration State | Approximate Parameter |
|---|---|
| 1 | $S_1^- = S_{11} - S_{12}S_{21}$ |
| 2 | $S_1^+ = S_{11} + S_{12}S_{21}$ |
| 3 | $S_2^- = S_{22} - S_{12}S_{21}$ |
| 4 | $S_2^+ = S_{22} + S_{12}S_{21}$ |
| 5 | $S_{21}$ |
| 6 | $S_{12}$ |

The calibration steps for the vector Automatic Network Analyzer system follow:

1. Set the electromagnetic signal generator output frequency f to a known fixed value.
2. Set the system in calibration state #1 and measure the detected voltages $V_{D5}$ and $V_{D6}$ while stepping the amplitude A over known values. Also measure phase comparator #2 voltages $V_{I2}$ and $V_{Q2}$. This forms a calibration data table.
3. Calculate the linear coefficients of $N^{th}$ order polynomials which model the amplitude calibration data using what is known in the art of numerical techniques as the Singular Value Decomposition (SVD) method. The calibration functions for amplitude are:

$$A_1 = A(V_{D5}, V_{D6})$$
$$= a_0 + a_1 V_{D5} + a_2 V_{D6} + a_3 V_{D5}^2 + a_4 V_{D6}^2 + \ldots$$

$$A_2 = B(A)$$
$$= b_0 + b_1 A + b_2 A^2 + \ldots$$

with A defined as:

$$A = \sqrt{V_I^2 + V_Q^2}$$

A final calibrated amplitude $A_c$ combines the redundant measurements $A_1$ and $A_2$:

$$A_c = C(A_1, A_2)$$
$$= c_0 + c_1 A_1 + c_2 A_2 + c_3 A_1^2 + c_4 A_2^2 + \ldots$$

It should be noted that similar equations for amplitude measurement apply to calibration states 2-4 due to the symmetry of the system.

4. For all calibration standards as DUT 160 and calibration states 1 and 2, step over a range of amplitudes and measure the detected voltages $V_{D1}$, $V_{D2}$, $V_{D5}$, $V_{D6}$ and the phase comparator voltages $V_{I1}$, $V_{Q1}$, $V_{I2}$, and $V_{Q2}$. This begins the $S_{11}$ calibration procedure.

5. Calculate the calibrated amplitudes $A_c$ for the measurements of step 4 using the equations of step 3. Form a calibration data table of the following parameters:
$S_1^+ = S_{11} + S_{12}S_{21}$
$S_1^- = S_{11} - S_{12}S_{21}$
$C_1 = V_{D1}/A_c$
$C_2 = V_{D2}/A_c$
$C_3 = V_{I1}/A_C$
$C_4 = V_{Q1}/A_c$ 6. Calculate the linear coefficients of $N^{th}$ order polynomials which model the calibration data using what is known in the art of numerical techniques as the Singular Value Decomposition (SVD) method. The calibration functions are:
$Re[S_1^+] = D(C_1, C_2, C_3, C_4)$
$Im[S_1^+] = E(C_1, C_2, C_3, C_4)$
$Re[S_1^-] = F(C_1, C_2, C_3, C_4)$
$Im[S_1^-] = G(C_1, C_2, C_3, C_4)$ 7. Calculate the linear coefficients of $N^{th}$ order polynomials which model the calibration data using what is known in the art of numerical techniques as the Singular Value Decomposition (SVD) method. The calibration functions are:
$Re[S_{11}] = H(Re[S_1^+], Im[S_1^+], Re[S_1^-], Im[S_1^-])$
$Im[S_{11}] = I(Re[S_1^+], Im[S_1^+], Re[S_1^-], Im[S_1^-])$
$Re[S_{12}S_{21}] = J(Re[S_1^+], Im[S_1^+], Re[S_1^-], Im[S_1^-])$
$Im[S_{12}S_{21}] = K(Re[S_1^+], Im[S_1^+], Re[S_1^-], Im[S_8^-])$ 8. Calculate the linear coefficients of $N^{th}$ order polynomials which model the final calibrated $S_{11}$ measurement using what is known in the art of numerical techniques as the Singular Value Decomposition (SVD) method. The final $S_{11}$ calibration functions are:
$Re[S_{11}] = L(Re[S_{11}], Im[S_{11}], Re[S_{12}S_{21}], Im[S_{12}S_{21}])$
$Im[S_{11}] = M(Re[S_{11}], Im[S_{11}], Re[S_{12}S_{21}], Im[S_{12}S_{21}])$ 9. Complete a calculation of the $S_{22}$ calibration functions following steps which are similar to the $S_{11}$ calibration.

10. For all calibration standards as DUT 160 and calibration state 5, step over a range of amplitudes and measure the detected voltages $V_{D5}$ and $V_{D6}$ and the phase comparator voltages $V_{I2}$ and $V_{Q2}$. This begins the $S_{21}$ calibration procedure.

11. Calculate the linear coefficients of $N^{th}$ order polynomials which model the calibration data of step 10 using what is known in the art of numerical techniques as the Singular Value Decomposition (SVD) method. The calibration functions for amplitude are:

$A_3 = N(V_{D5})$
$A_4 = O(V_{D6})$

A combination of the redundant amplitude measures $A_3$ and $A_4$ form a final calibrated amplitude $A_5$:

$A_5 = P(A_3, A_4)$

12. Calculate variables $X_1$ and $X_2$:

$X_1 = V_{I2}/A_5$
$X_2 = V_{Q2}/A_5$

13. Calculate the linear coefficients of $N^{th}$ order polynomials which model the calibration data of step 10 using what is known in the art of numerical techniques as the Singular Value Decomposition (SVD) method. The calibration functions are:

$Re[S_{21}] = Q(X_1, X_2)$
$Im[S_{21}] = R(X_1, X_2)$

The final $S_{21}$ calibration equation is:

$Re[S_{21}] = S(Re[S_{21}], Im[S_{21}], Re[S_{12}S_{21}], Im[S_{12}S_{21}])$ with the variable $S_{12}S_{21}$ obtained from step 7.

14. Complete a calculation of the $S_{12}$ calibration functions following steps which are similar to the $S_{21}$ calibration.

When the calibration steps are completed, the model functions permit calculation of the calibrated S-parameters of an unknown DUT from known control inputs and uncalibrated measurements. The steps for completing calibrated DUT S-parameter measurements follow.

1. Set the system sequentially in calibration states 1, 2, and 5.
2. Measure the detected voltages $V_{D1}$, $V_{D2}$, $V_{D3}$, $V_{D4}$, $V_{D5}$, and $V_{D6}$ corresponding to each calibration state. Also, measure the phase comparator voltages $V_{I1}$, $V_{Q1}$, $V_{I2}$, and $V_{Q2}$.
3. Calculate $S_{11}$ and $S_{21}$ from the calibration equations.
4. Complete calculations of $S_{22}$ and $S_{12}$ following steps which are similar to the $S_{11}$ and $S_{21}$ calculations.

It should be noted that the calibration equations can be extended to include additional parameters which affect system performance. For example, including temperature in the equations calibrates system sensitivity to this parameter.

Parts used in the disclosed configuration include, but are not limited to, the following: Part No. HP33150A from Hewlett Packard, Palo Alto, CA 94303-0890 for a combined electromagnetic signal choke and low-frequency signal block; Part No. 96519055 from Alpha Industries, Semiconductor Division, Woburn, MA 01801 for a PIN diode; Part No. CB-102-5 from Allen-Bradly Electronic Components Division, Greensboro, NC 27415-4309 for a bias resistor, Part No. O-J4-100-300 from Olektron Corporation, Webster, MA 01570 for a 90° hybrid; Part No. O-PC-300/ZB from Olektron Corporation for a phase comparator; Part No. O-H-30U from Olektron Corporation for a 180° hybrid; Part No. MCL ZMSW-1211 from Mini-Circuits Labs, Brooklyn, NY 11235-0003 for a SPDT switch; Part No. MCL ZEM-2B from MiniCircuits Labs for a modulator; and Part No. 6062A from John Fluke Manufacturing Co., Inc., Everett, WA 98206 for a signal generator.

Vector Spectrum Analyzer System

Reference is made to FIG. 8 in the drawing for disclosure of the invention configured as a vector spectrum analyzer system. The unit provides improved accuracy using moderately priced hardware through improved calibration compared to the prior art. The main circuitry is common to the vector ANA system discussed in FIG. 7. Therefore a single unit can function as either a vector network analyzer or a vector spectrum analyzer.

Figure 8A:
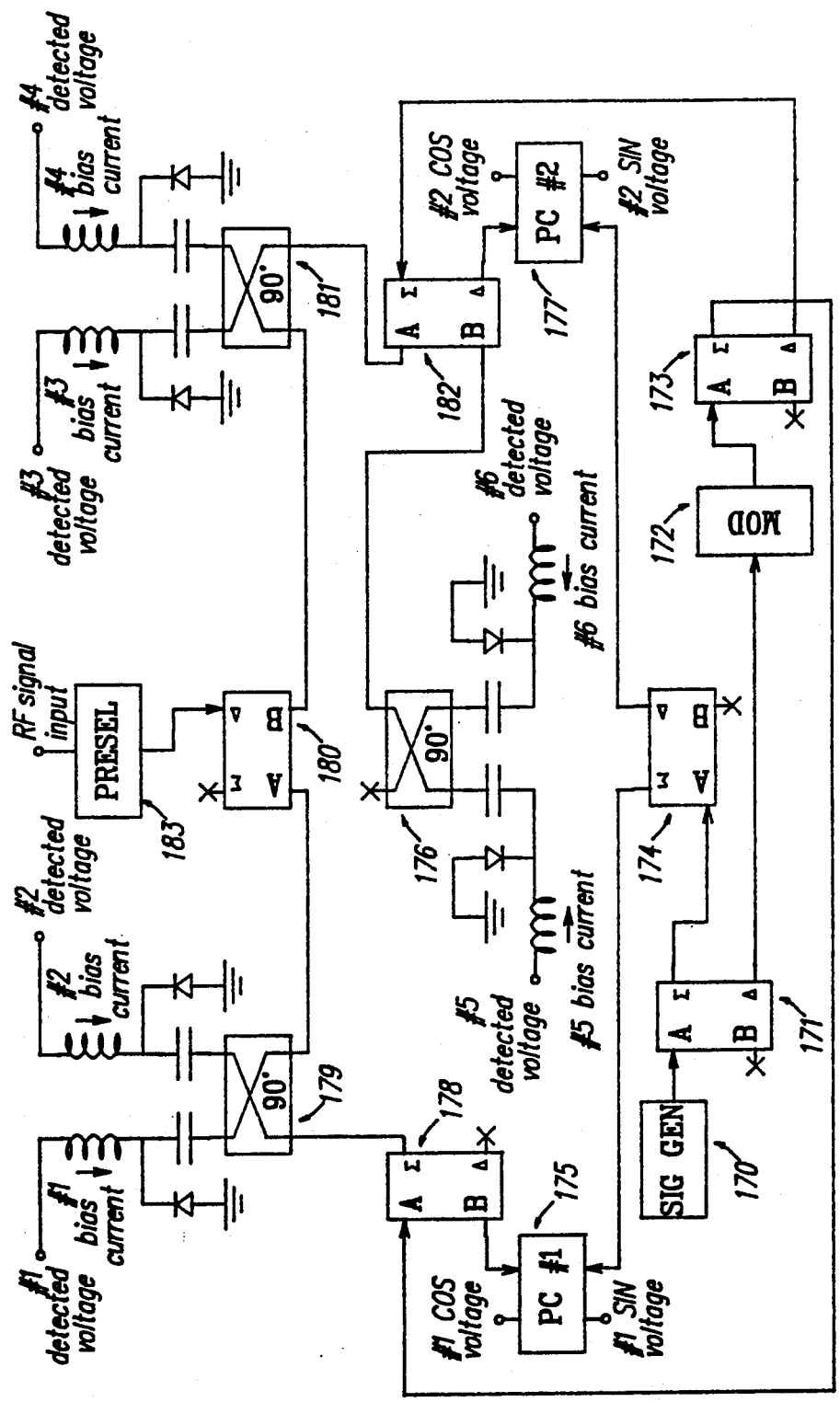
FIG. 8a is the block diagram for a spectrum analyzer which measures the amplitude and phase versus frequency of an electromagnetic signal using circuitry common to the vector ANA.

In FIG. 8a, the output from a reference signal generator 170 with controllable frequency is split by 180° hybrid 171. The signal feeds 180° hybrid 174 and provides reference inputs to phase comparator PC #1 175 and phase comparator PC #2 177. For the discussion of the components and function of a phase comparator, refer to the section on FIG. 6. The modulator 172 permits periodic control of the reference electromagnetic signal amplitude and/or phase for measurement noise reduction and/or system calibration. The 180° hybrid 173 routes the reference signal to 180° hybrid 178 and 180° hybrid 182.

An RF or other electromagnetic signal feeds a preselector filter 183. The preselector feeds the difference port of 180° hybrid 180. It should be noted that the symmetrical circuitry forms balanced reference signal inputs to 180° hybrid 180, and the reference signal is isolated from the electromagnetic input signal.

Hybrid multifunction controller/detector 176 forms a matched detector, while controllers/detectors 179 and 181 form test paths. All controllers/detectors are biased for maximum detection efficiency and minimum signal attenuation. For a discussion of the components and function of a hybrid multifunction controller/detector, refer to the discussion of FIG. 4.

The phase comparators 175 and 177 receive the signals from the test path. The cosine voltage $V_{I1}$ of PC #1, the sine voltage $V_{Q1}$ of PC #', the cosine voltage $V_{I2}$ of PC #2, and the sine voltage $V_{Q2}$ of PC #2 provide measures of the electromagnetic signal input. The detected voltages $V_{D1}$, $V_{D2}$, $V_{D3}$, and $V_{D4}$ provide additional measures of the signal. Detected voltages $V_{D5}$ and $V_{D6}$ provide measures of the reference signal amplitude. It should be noted that controllers/detectors 179 and 180 are not symmetric within the system. This does not affect the symmetry of the reference signals to 180° hybrid 180, but does provide added measurement of the standing waves created by the forward traveling reference signal and the backward traveling electromagnetic signal in controllers/detectors 179 and 181.

A listing of the correspondence between elements in FIG. 8a and FIG. 1b follows. Signal generator 170 corresponds to reference signal source 20. The RF or other electromagnetic signal input at preselector filter 183 corresponds to test signal source 21. Power-splitting 180° hybrid 171 corresponds to directional couple 22. Phase comparator 177 corresponds to receiver 28. Components 173, 176, and 182 correspond to reference signal path 23, and components 180, 181, 182, and 183 correspond to test signal path 24. Additional circuitry common to the vector network analyzer system remains and provides redundant measurements for increased accuracy. The interfaces of system controller 25 and system model 26 of FIG. 1 are shown in FIG. 8.

Three series of measurements determine the electromagnetic signal input frequency, magnitude, and phase: (1) the detected voltages $V_{D1}$, $V_{D2}$, $V_{D3}$, and $V_{D4}$ provide measures of the standing waves created by the forward traveling reference signal and the backward traveling electromagnetic signal in controllers/detectors 179 and 181, (2) phase comparators 175 and 177 provide a homodyne measurement of the signal parameters, and (3) phase comparators 175 and 177 provide a heterodyne measurement of the signal parameters. The redundant measurements facilitate calibration and increase accuracy.

The calibration steps for homodyne measurements follow.

1. Connect an electromagnetic signal with controllable frequency f, phase $\phi$, and amplitude A to the RF or other electromagnetic signal input. A convenient signal source for homodyne measurement calibration is the terminated port of 180° hybrid 178.

2. Tune preselector filter 183 to the input frequency.

3. Step the frequency f, phase $\phi$, and amplitude A through a range of values. Measure the cosine voltage $V_I$ and sine voltage $V_Q$ of phase comparators #1 and #2. Also measure the detected voltages $V_{D1}$, $V_{D2}$, $V_{D3}$, $V_{D4}$, $V_{D5}$, and $V_{D6}$. This forms a calibration data table.

4. Variables $R_{IQ}$ and $R_{QI}$ are defined as $V_I/V_Q$ and $V_Q/V_I$, respectively. Calculate a data table with $R_{IQ}<1$ and $R_{QI}<1$ for phase comparator 175 (PC #1) and phase comparator 177 (PC #2).

5. Calculate the amplitudes A corresponding to ideal phase comparators PC #1 and PC #2:

$$A = \sqrt{V_I^2 + V_Q^2}$$

6. Calculate the linear coefficients of $N^{th}$ order polynomials which model the amplitude calibration data using what is known in the art of numerical techniques as the Singular Value Decomposition (SVD) method. The calibration functions for amplitude are:
  $A_1 = G(A, V_{D5}, f)$
using the data from PC #1 and:
  $A_2 = H(A, V_{D6}, f)$
using the data from PC #2, 7. Calculate the linear coefficients of $N^{th}$ order polynomials which model the amplitude calibration data using what is known in the art of numerical techniques as the Singular Value Decomposition (SVD) method. The final function $A_c$ provides redundant calibrated amplitude measurement with increased accuracy:
  $A_c = J(A_1, A_2, f)$ 8. Calculate the linear coefficients of $N^{th}$ order polynomials which model the phase calibration data using what is known in the art of numerical techniques as the Singular Value Decomposition (SVD) method. The calibration functions for phase are:
  $\phi_1 = K(R_{IQ}, f)$ for $R_{IQ}<1$
  $\phi_1 = L(R_{QI}, f)$ for $R_{QI}<1$
for PC #1 and PC #2 measurements and:
  $\phi_2 = M[(V_{D1}-V_{D2})/V_{D5}, (V_{D3}-V_{D4})/V_{D6}, f]$
for the detected voltage measurements.

9. Calculate the linear coefficients of $N^{th}$ order polynomials which model the phase calibration data using what is known in the art of numerical techniques as the Singular Value Decomposition (SVD) method. The final function $\phi_c$ provides redundant calibrated phase measurement with increased accuracy:
  $\phi_c = O(\phi_1, \phi_2, f)$ The calibration steps for heterodyne measurements are analogous to the above steps except for the following differences: (1) the signal generator frequency and the preselector frequency are offset by the heterodyne intermediate frequency (IF), (2) the phase comparator voltages are at the IF instead of DC, and (3) standing wave measurements based on detected voltages $V_{D1}$, $V_{D2}$, $V_{D3}$, and $V_{D4}$ no longer have meaning and $\phi_2$ in step 8 does not apply.

When the calibration steps have been completed the model functions permit calculation of the calibrated amplitude and phase versus frequency for an unknown electromagnetic signal. The steps for completing a calibrated measurement of signal amplitude and phase versus frequency follow:

1. Set the signal generator 170 frequency and preselector filter 183 frequency.

2. Measure the voltages $V_I$ and $V_Q$ for PC #1 and PC #2, and measure the detected voltages $V_{D1}$, $V_{D2}$, $V_{D3}$, $V_{D4}$, $V_{D5}$, and $V_{D6}$.

3. Calculate $R_{IQ}$, $R_{QI}$, and A.

4. Calculate $A_1$, $A_2$, and $A_c$ using the calibration models.

5. Calculate $\phi_1$, $\phi_2$, and $\phi_c$ using the calibration models.

6. For increased accuracy with a constant signal, complete multiple measurements and average the results.

Figure 8B:
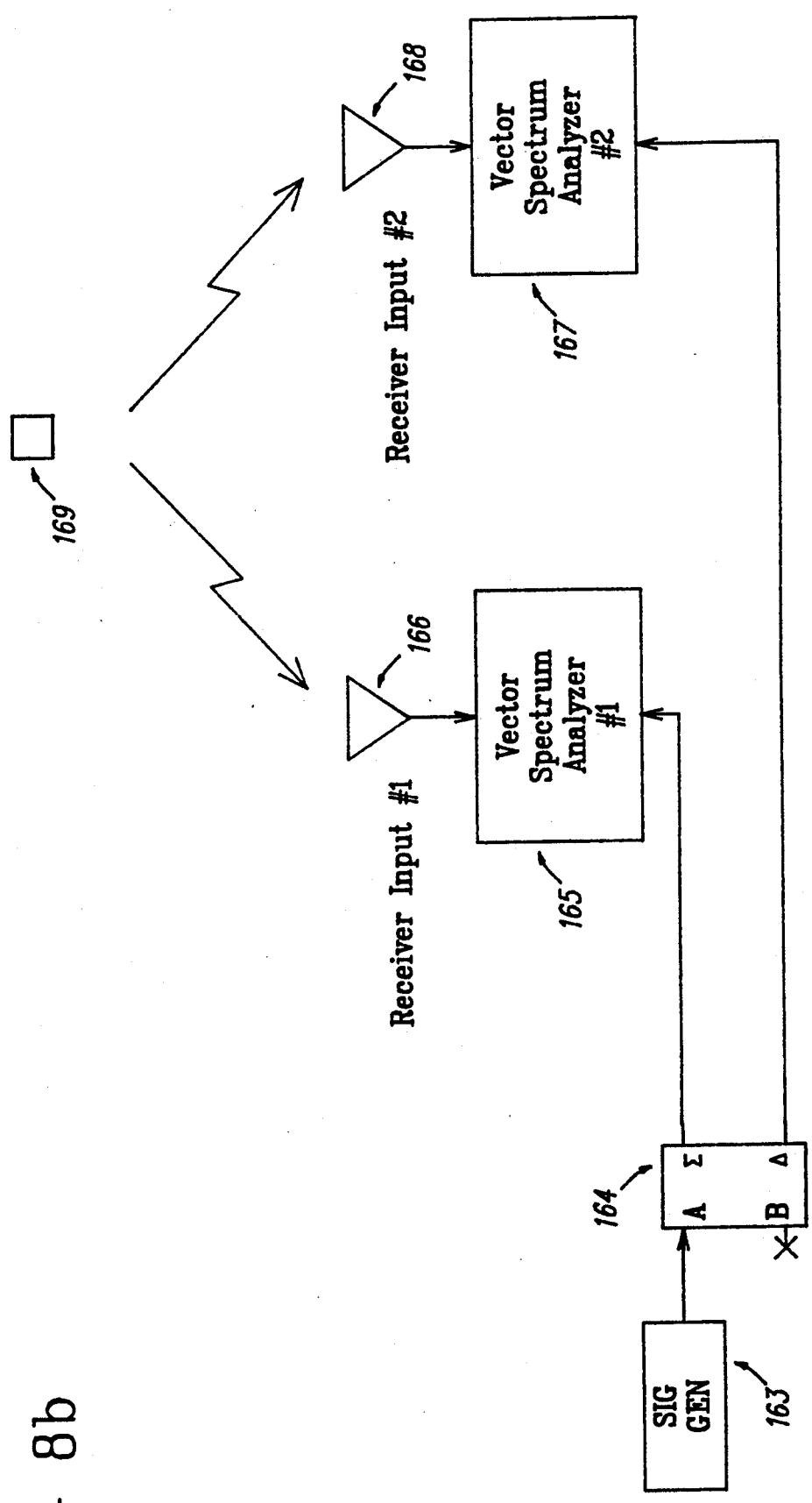
FIG. 8b depicts a passive direction finding system based on the vector spectrum analyzer.

In FIG. 8b, two vector spectrum analyzers 165 and 167 operating in parallel from a common signal generator 163 measure the relative amplitude and phase of two input signals to form a passive direction finding system. For antenna inputs separated by a distance, this provides a measurement of the direction of arrival of a signal source. Signal generator 163 serves as a common reference signal to vector spectrum analyzers 165 and 167 through power splitter 164. Signal source 169 to receiver input 166 forms a reference signal path, and signal source 169 to receiver input 168 forms a test signal path. Vector spectrum analyzers 165 and 167 provide calibrated measurement of the angle of arrival of the signal based on the calibration models of the vector spectrum analyzer of FIG. 8a.

Figure 8C:
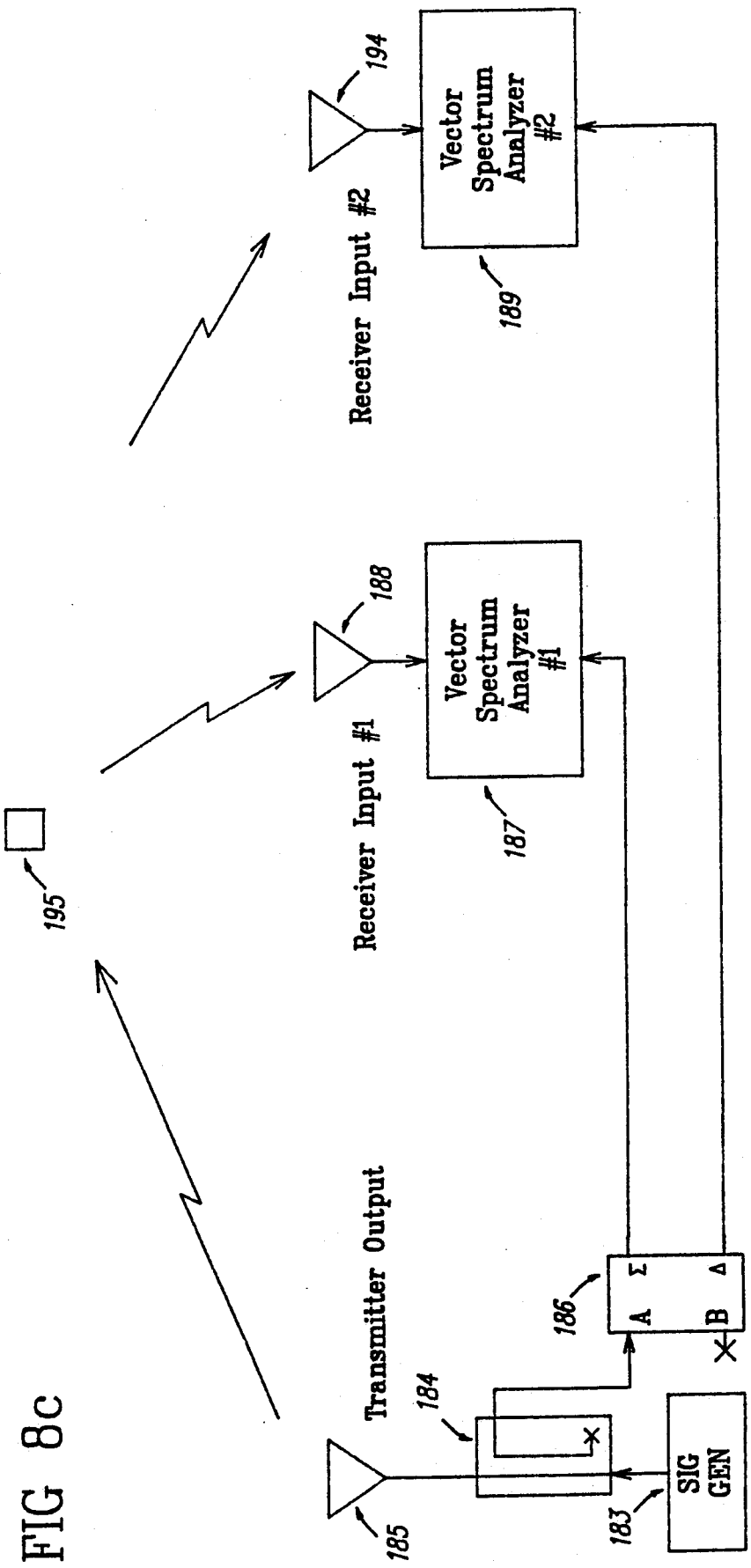
FIG. 8c depicts a phased array or bistatic radar system based on the vector spectrum analyzer.

In FIG. 8c, two vector spectrum analyzers 187 and 189 operating in parallel from a common signal generator 183 measure the relative amplitude and phase of two reflected/transmitted signals from an illuminated target 195 to form a phased array or bistatic radar system. For antenna inputs separated by a distance, this provides a measurement of the direction of arrival of a signal source. Signal generator 183 serves as a common reference signal to vector spectrum analyzers 187 and 189 through directional coupler 184 and power splitter 186. Signal generator 183 also illuminates target 195 through transmitter output 185. The reflected/transmitted signal from target 195 to receiver input 188 forms a reference signal, and the reflected/transmitted signal from target 195 to receiver input 194 forms a test signal. Vector spectrum analyzers 187 and 189 provide calibrated measurement of the angle of arrival of the signal based on the calibration models of the vector spectrum analyzer of FIG. 8a.

It should be noted that the calibration models are not based on calculating the correlation of signals by integrating over time the product of the signals. Also, the vector spectrum analyzers exploit the unique advantages of PIN diodes operating as both controllers and detectors, thereby providing improved calibration accuracy. Therefore, the direction finding system can be used for precise measurement of fast frequency-hopping signals. This permits operation of low observable frequency-hopping bistatic or phased array radar.

Parts used in the disclosed configuration include, but are not limited to, the following: Part No. HP33150A from Hewlett Packard, Palo Alto, CA 94303-0890 for a combined electromagnetic signal choke and low-frequency signal block; Part No. 96519055 from Alpha Industries Semiconductor Division, Woburn, MA 01801 for a PIN diode; Part No. CB-102-5 from Allen-Bradly Electronic Components Division, Greensboro, NC 27415-4309 for a bias resistor; Part No. O-J4-100-300 from Olektron Corporation, Webster, MA 01570 for a 90° hybrid; Part No. O-PC-300/ZB from Olektron Corporation for a phase comparator; Part No. O-H-30U from Olektron Corporation for a 180° hybrid; Part No. O-D4-20U from Olektron Corporation for a directional coupler; Part No. MCL ZMSW-1211 from Mini-Circuits Labs, Brooklyn, NY 11235-0003 for a SPDT switch; Part No. MCL ZEM-2B from Mini-Circuits Labs for a modulator. Part No. 6062A from John Fluke Manufacturing Co., Inc., Everett, WA 98206 for a signal generator; and Part No. STRAP-2H from Russel Industries, Inc., Oceanside, NY 11572 for an antenna.

Adaptive Predictor Interference Canceler

Figure 9:
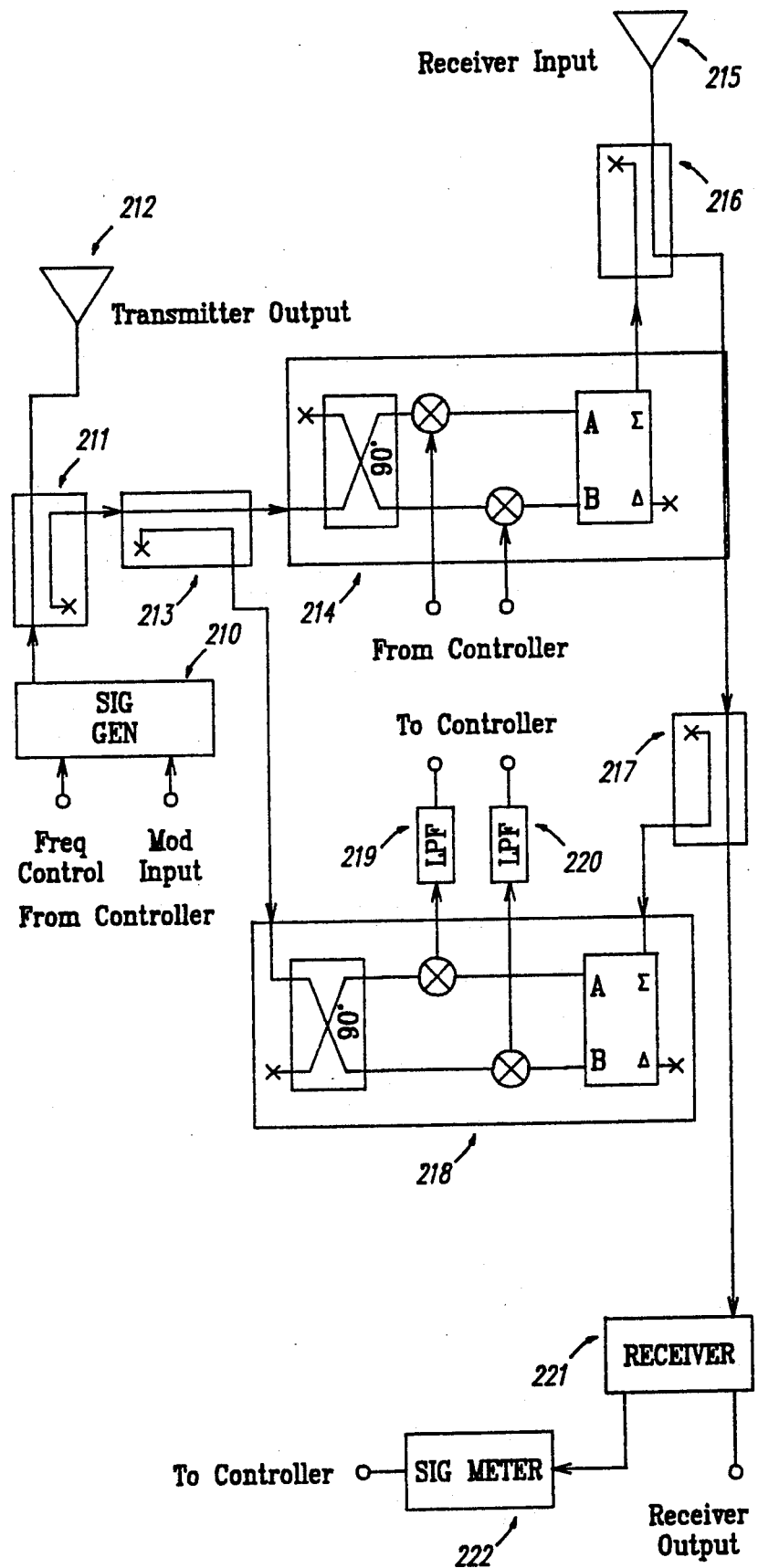
FIG. 9 is the block diagram for an Adaptive Predictor Interference Canceler based on the generic adaptively controlled electromagnetic signal analyzer system.

Reference is made to FIG. 9 in the drawing for disclosure of the invention configured as an adaptive predictor interference canceler. The unit reduces signal distortion in amplitude-modulated and frequency-hopping systems compared to the prior art; it also solves the problems of adaptive interference cancellation in new fast frequency-hopping systems.

Either a hardwired analog system controller or a software programmable digital system controller sets the frequency and modulation input of signal generator 210. The modulation control permits both transmission of information and pseudo-noise signal coding for spread spectrum operation. The frequency control permits operation in a fast frequency-hopping mode. The signal generator feeds transmitter antenna output 212 through directional coupler 211.

Directional couplers 213 and 216 combined with complex phasor modulator (CPM) 214 form a controlled reference signal path. The sample of the signal generator output from directional coupler 211 feeds complex phasor modulator (CPM) 214 through directional coupler 213. For high-performance cancellation in fast frequency-hopping systems, the CPM disclosed in FIG. 5b is the preferred embodiment. The CPM adjusts the signal in amplitude and phase according to inputs from the system controller and injects the resultant into the receiver line through directional coupler 216.

Transmitter output antenna 212 and receiver input antenna 215 form a test signal path which introduces interference in the receiver 221. The output of directional coupler 216 is the sum of the signal generator signal propagating through the two separate paths. When the system controller inputs to the CPM are set such that the signal through the controlled path is equal in magnitude and opposite in phase to the signal through the test path, the interfering transmitter signal in the receive line is canceled. Signals which are not correlated with the interference are not affected.

Directional couplers 213 and 217 combined with phase comparator (PC) 218 and low-pass filters (LPF) 219 and 220 provide error measurement. The sample of the signal generator output from directional coupler 213 serves as a reference input to PC 218, and the sample of the canceled interference from directional coupler 217 serves as a signal input to PC 218. The signals $e_I$ and $e_Q$ from LPF 219 and 220, respectively, are measures of the product of the canceled received signal with the transmitted signal. It should be noted that for a fast frequency-hopping system without perfect phasing, the filters must pass frequencies somewhat above the frequency-hopping rate in order for signals $e_I$ and $e_Q$ to respond to the rapid frequency changes. In this case, the conventional means for determining signal correlation by integrating $e_I$ and $e_Q$ over an extended time breaks down.

The signal from directional coupler 217 feeds the receiver 221. A signal from receiver 221 is output to a signal meter 222 which provides an additional measure of cancellation accuracy. When the modulation input of the interfering transmitter comes from the controller and when the desired signal at the receiver comes from a friendly source with known characteristics and timing, the signal-to-interference-and-noise ratio (SINR) S can be measured by the controller. The receiver output contains the demodulated information from a desired signal.

A listing of the correspondence between elements in FIG. 9 and FIG. 1a follows. Signal generator 210 corresponds to reference signal source 10. Components 217, 218, 219, 220, 221, and 222 combined correspond to receiver 18. Directional coupler 211 splits the signal generator output power as does 180° hybrid 12. Directional coupler 213 corresponds to directional coupler 11. Antennas 212 and 215 form the test path, and complex phasor modulator 214 forms the reference signal path. Directional coupler 216 combines the test signal and reference signal as does 180° hybrid 17. The interfaces of system controller 15 and system model 16 of FIG. 1 are shown in FIG. 9.

Operation of the canceler in a fast frequency-hopping system corresponds closely to the calibration and operation of the disclosed automatic network analyzer system. A listing of the operation steps follows:

1. Operate the system through a range of frequencies in a slow frequency-hopping mode, and complete a binary search for the complex I and Q control inputs to the CPM which minimize the errors $\epsilon_I$ and $\epsilon_Q$ and maximize the signal-to-interference-and-noise ratio (SINR) S. Form a table of the system response as a function of complex control inputs I and Q and frequency f.

2. Calculate the linear coefficients of $N^{th}$ order polynomials which model the system response table using what is known in the art of numerical techniques as the Singular Value Decomposition (SVD) method. The model functions are:

$\epsilon_I = X(I, Q, f)$
$\epsilon_Q = Y(I, Q, f)$
$S = Z(I, Q, f)$

3. For fast frequency-hopping operation, use the system models to predict the complex I and Q controls which will minimize $\epsilon_I$ and $\epsilon_Q$ and maximize SINR S for successive frequency hops using what is known in the art of numerical techniques as the Newton-Raphson gradient search method. This provides a prediction for optimal interference cancellation.

4. At the beginning of each frequency hop, set the complex I and Q controls to the values predicted by the models for optimal interference cancellation at the new frequency.

5. During the dwell time at each frequency, measure $\epsilon_I$ and $\epsilon_Q$ and SINR S to form an updated system response table.

6. Calculate the linear coefficients of $N^{th}$ order polynomials which model the updated system response table using what is known in the art of numerical techniques as the Singular Value Decomposition (SVD) method. This adapts the system control to any system or environment changes.

7. Continuously cycle through steps 3-6 for each frequency hop.

The system response models correspond to operation over the complete frequency band. Although the instantaneous frequency hops change rapidly, the total system is a function of essentially constant geometry and a slowly varying environment. Therefore, after initial convergence to accurate models, any additional model adaptation can be relatively limited and slow. Background calculation of model updates using a small fraction of system response measurements is sufficient, and the calculations can be completed in real time without extraordinary computational speed. It should be noted that the time frame for a "fast" frequency hop is typically of the order of microseconds, while the time frame for a "slow" environment change is typically of the order of milliseconds. Therefore the model adaptation is still quite responsive to environmental changes.

It should be noted that the calibration equations can be extended to include additional parameters which affect system performance. For example, including a temperature measurement in the equations calibrates system sensitivity to this parameter.

Parts used in the disclosed configuration include, but are not limited to, the following: Part No. HP33150A from Hewlett Packard, Palo Alto, CA 94303-0890 for a combined electromagnetic signal choke and low-frequency signal block; Part No. 96519055 from Alpha Industries, Semiconductor Division, Woburn, MA 01801 for a PIN diode; Part No. CB-102-5 from Allen-Bradly Electronic Components Division, Greensboro, NC 27415-4309 for a bias resistor, Part No. O-J4-100-300 from Olektron Corporation, Webster, MA 01570 for a 90° hybrid; Part No. O-PC-300/ZB from Olektron Corporation for a phase comparator; Part No. O-H-30U from Olektron Corporation for a 180° hybrid; Part No. O-D410U from Olektron Corporation for a directional coupler; Part No. MCL ZMSW-1211 from Mini-Circuits Labs, Brooklyn, NY 11235-0003 for a SPDT switch; Part No. MCL ZEM-2B from Mini-Circuits Labs for a modulator; Part No. MCL SLP-10.7 from Mini-Circuits Labs for a low-pass filter; Part No. 6062A from John Fluke Manufacturing Co., Inc., Everett, WA 98206 for a signal generator; Part No. STRAP-2H from Russel Industries, Inc., Oceanside, NY 11572 for an antenna; and Part No. A-7550/2,4,6 from IFR Inc., Wichita, Kansas 67215 for a receiver and signal meter.

The above-described embodiments are furnished as illustrative of the principles of this invention, and are not intended to define the only embodiments possible in accordance with our teaching. Rather, the invention is to be considered as encompassing not only the specific embodiments shown, but also any others falling within the scope of the following claims.

What is claimed is:

1. An adaptive control electromagnetic signal analyzer system comprising:
   a signal receiver means for receiving electromagnetic signals;
   a reference signal transmission path including a multifunction controller/detector, said reference signal transmission path having a plurality of control inputs;
   a test signal transmission path;
   a power divider means for splitting signal power, said power divider means having an input port and two output ports, said output ports being connected to said reference path and said test path;
   a reference signal source means for supplying a reference electromagnetic signal to said power divider input port, a portion of said reference electromagnetic signal being directionally coupled to an input of said electromagnetic signal receiver;
   a means for modeling characteristics of said reference path and said test path;
   a means for predicting the response to said system to changes in said reference signal source and said reference path controls based on said modeled characteristics of said reference path and said test path;
   a system controller means for system measurement and control with measured inputs from said reference path and said signal receiver; with calibration and system response prediction inputs from said predicting means; and with control outputs to said reference signal source, said reference path, said receiver, said modeling means, and said predicting means; and
   a signal summing means for combining signals from said reference path and said test path, said summing means having an output to said signal receiver.

2. The analyzer system of claim 1 wherein:
   said modeling means includes a means for calculating said reference path control inputs required to maintain a desired system response for known changes in said reference signal source characteristics
   and for minimizing predicted versus measured system response error by adapting model parameters based on recent previously measured and predicted system responses.

3. The analyzer system of claim 1 wherein said system control, modeling, and predicting means comprises a digital computer.

4. The analyzer system of claim 1 wherein said system control, modeling, and prediction means comprises analog circuitry.

5. The analyzer system of claim 1 wherein said test signal transmission path includes a multifunction controller/detector operatively connected to said system controller.

6. The analyzer system of claim 1 wherein said multifunction controller/detector circuit comprises:
   a biased semiconductor junction having nonlinear current-versus-voltage dependence, nonlinear capacitance-versus-voltage dependence, and an electromagnetic signal impedance dependent on low-frequency bias current, said biased semiconductor junction operating simultaneously as an electromagnetic detector and a controlled impedance for electromagnetic signals; and
   a semiconductor junction bias circuit having both a low-frequency signal path through said semiconductor junction and a high-frequency signal path through said semiconductor junction, with said low-frequency signal path isolated from said high-frequency signal path; said bias circuit having a controllable current through said low-frequency signal path and having a semiconductor junction detected voltage output isolated from said high-frequency signal path; said controllable current being independent of said detected voltage output, and said detected voltage output being dependent on a high-frequency electromagnetic signal through said semiconductor junction.

7. The analyzer system of claim 6 wherein said multifunction controller/detector further comprises temperature compensation means for compensating changes in operational characteristics of said controller/detectors due to changes in temperature.

8. The analyzer system of claim 7 wherein said temperature compensation means comprises:
   a reference biased semiconductor junction circuit isolated from the electromagnetic signal appearing in said reference signal transmission path;
   a test biased semiconductor junction circuit exposed to the electromagnetic signal appearing in said reference signal transmission path;
   means for measuring a difference between the detected voltage from said test biased semiconductor junction and the voltage from said reference biased semiconductor junction with both junctions having virtually equal controllable bias currents and a common reference node.

9. An adaptive control electromagnetic signal analyzer system comprising:
   a signal receiver means for receiving electromagnetic signals;
   a reference signal transmission path including a multifunction controller/detector, said reference signal transmission path having a plurality of control inputs;
   a test signal transmission path including a multifunction controller/detector, said test signal transmission path having a plurality of control inputs;
   a reference signal source means for supplying a reference electromagnetic signal to input port of said reference signal transmission path, a portion of said reference electromagnetic signal being directionally coupled to an input of said electromagnetic signal receiver;
   a test signal source means for supplying a test electromagnetic signal to an input port of said test signal transmission path;
   a means for modeling characteristics of said reference path and said test path;
   a means for predicting the response of said system to changes in said reference signal source and said reference path controls based on said modeled characteristics of said reference path and said test path;
   a system controller means for system measurement and control with measured inputs from said reference path and said signal receiver; with calibration and system response prediction inputs from said predicting means; and with control outputs to said reference signal source, said reference path, said receiver, said modeling means, and said predicting means; and
   a signal summing means for combining signals from said reference path and said test path, said summing means having an output to said signal receiver.

10. A method of calibrating an analyzer system that includes a signal receiver means for receiving electromagnetic signals, a reference signal transmission path including a multifunction controller/detector, said reference signal transmission path having a plurality of control inputs;
   a test signal transmission path;
   a power divider means for splitting signal power, said power divider means having input port and two output ports, said output ports being connected to said reference path and said test path;
   a reference signal source means for supplying a reference electromagnetic signal to said power divider input port, a portion of said reference electromagnetic signal being directionally coupled to an input of said electromagnetic signal receiver;
   a means for modeling characteristics of said reference path and said test path;
   a means for predicting the response of said system to changes in said reference signal source and said reference path controls based on the modeled characteristics of said reference path and said test path;
   a system controller means for system measurement and control with measured inputs from said reference path and said signal receiver; with calibration and system response prediction inputs from said predicting means; and with control outputs to said reference signal source, said reference path, said receiver, said modeling means, and said predicting means; and
   a signal summing means for combining signals from said reference path and said test path, said summing means having an output to said signal receiver; said method comprising:
   (a) selecting a calibration standard for insertion as the test signal transmission path, or selecting a test signal with known characteristics;
   (b) selecting a system state using known control outputs of said system controller;
   (c) measuring the system response and recording the system response-versus-control table;
   (d) returning to step (a) until completion of said system response-versus-control table; and
   (e) calculating a system model based on said system response-versus-control table with a calibration model and function consisting of a linear combination of nonlinear functions.

11. The method of claim 10 further comprising the steps of:
   (f) selecting a test signal transmission path of unknown electromagnetic propagation characteristics, or a test signal of unknown characteristics;
   (g) selecting a system state with said system controller;
   (h) measuring a system response and recording a system response-versus-control table;
   (i) returning to step (g) until completion of said system response-versus-control table; and
   (j) calculating electromagnetic propagation characteristics of calibration standard or test signal characteristics based on said system model.

12. A method for calibrating an analyzer system that includes:
   a signal receiver means for receiving electromagnetic signals;
   a reference signal transmission path including a multifunction controller/detector, said reference signal transmission path having a plurality of control inputs;
   a test signal transmission path including a multifunction controller/detector, said test signal transmission path having a plurality of control inputs;

a reference signal source means for supplying a reference electromagnetic signal to input port of said reference signal transmission path, a portion of said reference electromagnetic signal being directionally coupled to an input of said electromagnetic signal receiver;

a test signal source means for supplying a test electromagnetic signal to an input port of said test signal transmission path;

a means for modeling characteristics of said reference path and said test path;

a means for predicting the response of said system to changes in said reference signal source and said reference path controls based on said modeled characteristics of said reference path and said test path;

a system controller means for system measurement and control with measured inputs from said reference path and said signal receiver; with calibration and system response prediction inputs from said predicting means; and with control outputs to said reference signal source, said reference path, said receiver, said modeling means, and said predicting means; and a signal summing means for combining signals from said reference path and said test path, said summing means having an output to said signal receiver, said method comprising the steps of:

(a) selecting a calibration standard for insertion as the test signal transmission path, or selecting a test signal with known characteristics;

(b) selecting a system state using known control outputs of said system controller;

(c) measuring the system response and recording the system response-versus-control table;

(d) returning to step (a) until completion of said system response-versus-control table; and (e) calculating a system model based on said system response-versus-control table with a calibration model and function consisting of a linear combination of nonlinear functions.

13. The method of claim 12 further comprising the steps of:

(f) selecting a test signal transmission path of unknown electromagnetic propagation characteristics, or a test signal of unknown characteristics;

(g) selecting a system state with said system controller;

(h) measuring a system response and recording a system response-versus-control table;

(i) returning to step (g) until completion of said system response-versus-control table; and (j) calculating electromagnetic propagation characteristics of calibration standard or test signal characteristics based on said system model.

14. An adaptive control electromagnetic signal analyzer system comprising:

a signal receiver means for receiving electromagnetic signals;

a reference signal transmission path including a multi-function controller/detector, said reference signal transmission path having a plurality of control inputs;

a test signal transmission path;

a power divider means for splitting signal power, said power divider means having input port and two output ports, said output ports being connected to said reference path and said test path;

a reference signal source means for supplying a reference electromagnetic signal to said power divider input port, a portion of said electromagnetic signal being directionally coupled to an input of said electromagnetic signal receiver;

a means for modeling characteristics of said reference path and said test path;

a means for predicting the response of said system to changes in said reference signal source and said reference path controls based on the modeled characteristics of said reference path and said test path;

system controller means including inputs from said reference path and said signal receiver, and from said predicting means, and with outputs to said reference signal source, said reference path, said receiver, said modeling means and said predicting means; and a signal summing means for combining signals from said reference path and said test path, said summing means having an output to said signal receiver.

15. An adaptive control electromagnetic signal analyzer system comprising:

a reference signal transmission path having an input port, an output port, at least one control port, and at least one monitor port and comprising means for adjusting phase and amplitude of an electromagnetic signal traveling said reference path;

a test signal transmission path having an input port, an output port, at least one control port, and at least one monitor port and comprising means for adjusting phase and amplitude of an electromagnetic signal traveling said test path, said test path being adapted to permit insertion of a device under test;

a signal supplying means having at least one control port and a plurality of output ports, two of said output ports being connected to the input ports of said test path and said reference path;

a receiver having three input ports, at least one control port, and at least one monitor port, said input ports being connected to the output ports of said test path, said reference path, and said signal supplying means, said receiver producing a response to said input signals at said receiver output port;

a system controller having a plurality of input and output ports connected to the control and monitor ports of said test path, said reference path, said signal supplying means, and said receiver for monitoring and controlling operations of said analyzer system, said system controller further comprising means for modeling the characteristics of said reference path and said test path.

* * * * *